United States Patent [19]
Tsuboi et al.

[11] Patent Number: 5,809,542
[45] Date of Patent: Sep. 15, 1998

[54] DUMPING METHOD FOR DUMPING DATA TO A DUMP DATA STORAGE DEVICE THAT MANAGES THE THE DUMPING OF DATA UPDATED SINCE A PREVIOUS DUMP REQUEST

[75] Inventors: Toshiaki Tsuboi, Kawasaki; Akira Yamamoto, Sagamihara; Shigeru Kishiro, Odawara; Toshio Nakano, Chigasaki, all of Japan

[73] Assignees: Hitachi, Ltd.; Hitachi Microcomputer System, Ltd., both of Tokyo, Japan

[21] Appl. No.: 369,186

[22] Filed: Jan. 5, 1995

[30] Foreign Application Priority Data

Jan. 11, 1994 [JP] Japan .................................. 6-001245

[51] Int. Cl.$^6$ ........................................................ G06F 12/16
[52] U.S. Cl. .......................... 711/162; 711/113; 711/112; 395/184.04
[58] Field of Search ..................................... 711/112, 113, 711/152, 163, 114, 162, 182.04, 182.05, 182.09

[56] References Cited

U.S. PATENT DOCUMENTS

| | | | |
|---|---|---|---|
| 5,086,502 | 2/1992 | Malcolm | 395/182.06 |
| 5,163,148 | 11/1992 | Walls | 395/182.06 |
| 5,210,866 | 5/1993 | Milligan et al. | 395/182.04 |
| 5,226,157 | 7/1993 | Nakano et al. | 395/600 |
| 5,241,669 | 8/1993 | Cohn et al. | 395/180 |
| 5,241,670 | 8/1993 | Eastridge et al. | 395/180 |
| 5,327,551 | 7/1994 | Kaneko | 395/182.03 |
| 5,381,545 | 1/1995 | Baker et al. | 395/182.17 |
| 5,410,666 | 4/1995 | Nakano et al. | 395/441 |
| 5,487,160 | 1/1996 | Bemis | 395/441 |

FOREIGN PATENT DOCUMENTS

| | | |
|---|---|---|
| 0566964 | 10/1993 | European Pat. Off. . |
| 5-210555 | 8/1993 | Japan . |
| WOA9308529 | 4/1993 | WIPO . |

*Primary Examiner*—Eddie P. Chan
*Assistant Examiner*—Hong C. Kim
*Attorney, Agent, or Firm*—Fay, Sharpe, Beall, Fagan, Minnich & McKee

[57] ABSTRACT

An information processing system has a processor, a first storage unit, a controller connected between said processor and said first storage unit, and a second storage unit connected to said processor and for storing dump data, and a dump method thereof are disclosed. The controller manages updated regions of the first storage unit as write regions. In response to a dump request issued by the processor, the controller manages regions which are managed as the write regions and included in a dump portion as protected regions. If a write request for a region which is managed as protected region, the controller saves contents of the region to dump point file before executing a write operation, and release the region from the protected regions. The controller transfers contents of regions managed as protected track and contents of the dump point file to the processor as contents of regions to be dumped. At the end of dump processing, the controller deletes the dump point file and terminates management of the protected regions.

35 Claims, 33 Drawing Sheets

DUMPING METHOD FOR DUMPING DATA TO A DUMP DATA STORAGE DEVICE THAT MANAGES THE THE DUMPING OF DATA UPDATED SINCE A PREVIOUS DUMP REQUEST

BACKGROUND OF THE INVENTION

The present invention relates to an information processing system and a storage controller therefor. More particularly, the present invention relates to a dump method in which the dump volume can be reduced, and even if an update operation is performed during the dumping, the contents of memory at the starting of the dumping can be completely dumped.

Japanese Patent Laid-open No. 1-231150 discloses a dump method of an information processing system. According to the reference, first positional information for identifying a memory region updated between the start of a last dump and the start of a current dump, and second positional information for identifying a memory region updated during the dumping are collected. Using the first positional information, only the contents of the region updated between the start of the last dump and the start of the current dump are dumped. The contents updated during the dumping are dumped at the time of the next dumping by using the second positional information.

Japanese Patent Laid-open No. 5-210555 discloses a dump method in which all of the data in a predetermined dump portion are dumped. If an undumped region is updated during the dumping, the contents before the update are saved in a side file and dumped at the time of the next dumping operation.

The dumping method according to Japanese Patent Laid-open No. 1-231150 is advantageous in reducing the dump volume because the memory contents which are updated between the start of a last dump and the start of a current dump are dumped. However, if an undumped region is updated during the dumping, the contents at the start of the dumping are lost.

On the other hand, the dump method according to the Japanese Patent Laid-open No. 5-210555 is advantageous in that, even if an undumped region is updated during dumping, the data contents before the update are saved in a side file, thereby retaining the data at the start of the dumping. However, because all of the data inside proscribed dump portion are dumped, a huge dump volume results from the execution of the dump operation.

SUMMARY OF THE INVENTION

It is therefore an object of the present invention to provide a dump method for reducing the dump volume while completely dumping the contents of a specified dump portion of a storage device at the start of dumping even if the dump portion is updated during the dumping. It is also another object of the invention to provide a storage controller and an information system in which the dump method of the invention is employed.

According to one aspect of the present invention, the dump method is performed in an information processing system that includes a processor, a first storage unit having a plurality of tracks as units of data to be transferred on dumping, a controller connected between the processor and the first storage unit for controlling data transfer therebetween, and a second storage unit connected to the processor for storing the data to be dumped. In accordance with the dump method of the invention, a region to be dumped is designated by the processor and input to the controller. The controller registers the tracks of data included in the region, in which the data has been updated by the processor, into a protected track information area of memory. If a write request to a track registered in the protected track information are issued during the dump processing, the controller stores the contents of the track to a dump point file, deletes the registration of the track from the protected track information area, and writes the data into the track. In the dump processing, the controller transfers the contents of the tracks registered in the protected track information area and also the contents of the dump point file to the second storage unit. Then, the registration of tracks whose contents have been transferred are deleted from the protected track information area. Finally, the controller deletes the dump point file.

In another aspect of the invention, a storage controller connected to a processor and a storage unit to control the storage unit is provided. The controller has first storage means for storing write region information relating to a region in the storage unit to which a write operation directed by a write instruction issued from the processor to the storage unit. Second storage means are provided for storing the protected region information relating to the region in the storage unit included in a portion to be dumped that is specified by the processor and the corresponding write region information that is stored in the first storage means and for deleting the write region information corresponding to the region included in the portion to be dumped from the first storage means. Protecting means are provided for saving in a dump point file the contents of a region to be written that is designated by the processor with a write operation if the protected region information corresponding to the region to be written is stored in the second storage means, and for deleting the protected region information corresponding to the designated region from the second storage means. Dump read and transfer means are also provided for transferring the contents of a region to be read for dumping specified by the processor with a dump read instruction if the protected region information corresponding to the region to be read for dump is stored in the second storage means. In response, transfer means transfers the contents of the dump point file to the processor upon receiving a dump point file read instruction issued from the processor.

Further aspects of the invention include an information system having a processor, a first storage unit for storing data processed by the processor, a second storage unit for storing dump data of the first storage unit. The system has a first information block for storing updated region information corresponding to a region in which the contents are updated by the processor in the first storage unit, updated region setting means, operative in response to a write operation executed by the processor, for setting the updated region information corresponding to a region to be updated by the write operation into the first information block, second information block for storing protected region information corresponding to a region having data to be dumped into the second storage means, protected region setting means, operative in response to a dump instruction issued by said processor, for setting the protected region information corresponding to a region included in a dump portion designated by the dump instruction and the corresponding updated region information stored in the first information block and for deleting the updated region information corresponding to the region included in said dump portion in the first information block. Protecting means, operative in response to said write operation, are also provided for saving the contents of the region to be updated into a dump point file before updating the data of the region to be updated if the protected region information corresponding to the region to be updated is stored in the second information block. Further, the protected region information corresponding to the region to be updated is deleted from the second information block, and transfer means is provided for transferring the contents of the track for which the protected region information corresponding thereto has been stored in the second information block and also the contents of the dump point file to the processor for storing the dump data into the second storage unit.

According to the above described aspects of the invention, an updated region of a storage region is managed as a write region and a region managed as the write region and included in the dump portion is managed as a protected region at the beginning of the dump processing. If a write request which designates a region that is managed as a protected region is issued during the dump processing, the contents of the region are saved to a dump point file before that data is written to the region. Then, the region is removed from the protected region. Only the contents in the protected region and the dump point file contents are dumped in the dump operation.

Thus, since only the contents in the protected region and the dump point file are dumped, the dump volume can be reduced. On the other hand, if an undumped region has been updated during dumping, contents of the undumped region before the update are saved to a dump point file from which the contents are dumped, so that the contents at the start of the dumping operation can be dumped completely.

DETAILED DESCRIPTION OF THE PREFERRED EMBODIMENTS

This invention will be described in further detail by way of example with reference to the accompanying drawings. It should be noted that the following description does not restrict the scope and spirit of the present invention.

Figure 1:
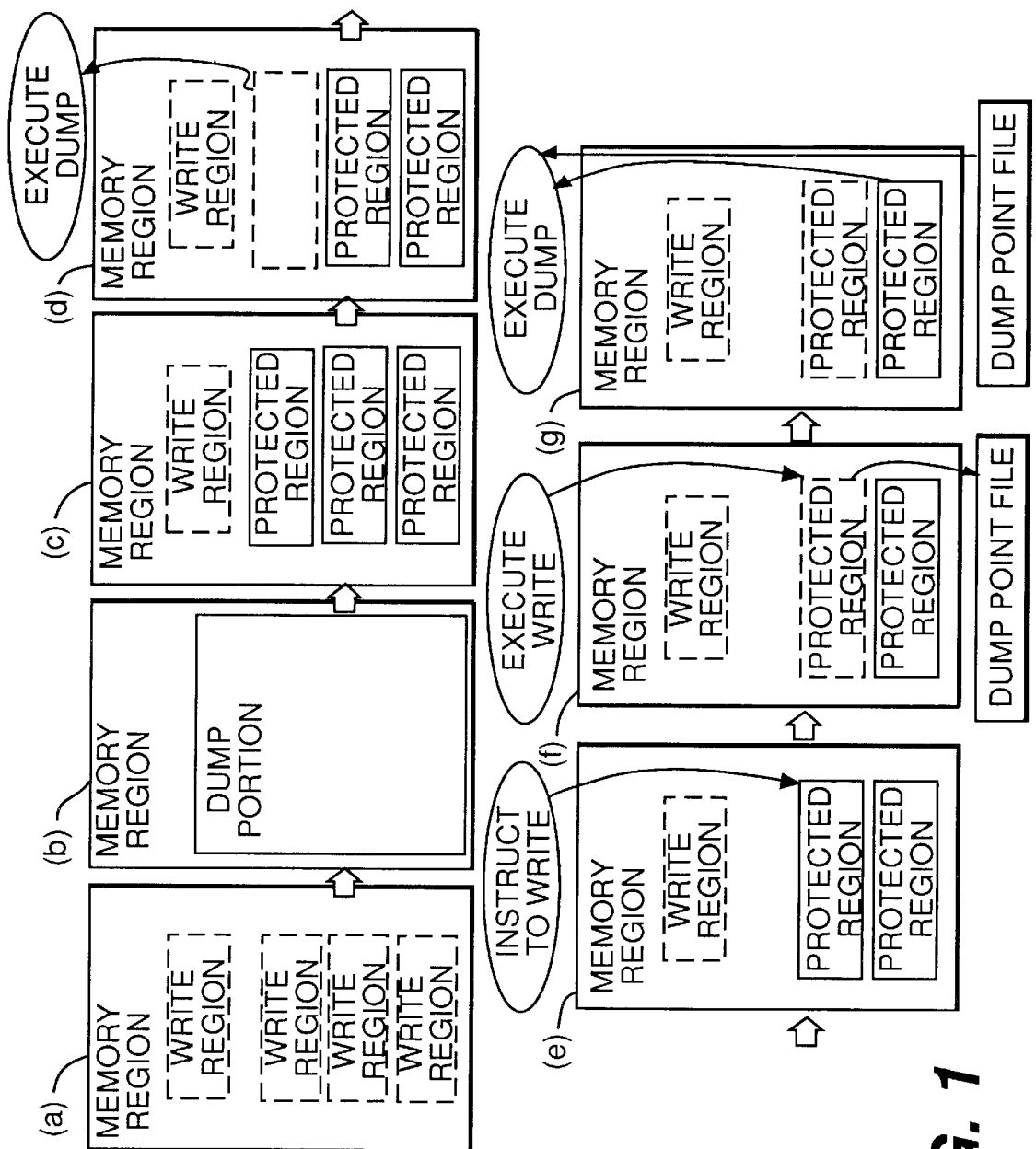
FIG. 1 is a schematic diagram illustrating the flow of the dump processing according to the invention.

Before describing each of the embodiments of the invention, the dump method according to the invention will be outlined with reference to FIG. 1. FIG. 1 shows the flow of the dump processing of the invention.

In step (a), each of the updated regions in a storage region of the memory unit is managed as a write region. In step (b), a dump portion is set. Then, as shown in step (c), write regions inside the dump portion are managed as protected regions. In step (d), only the protected regions are dumped sequentially. Each of the dumped regions is removed from the protected regions. In step (e), a write instruction is issued to an undumped protected region. Then, as shown in step (f), contents of the undumped protected region before writing are saved to a dump point file. Then the data specified by the write command is written to the region. The region is then removed from the protected region and is managed as a write region. The data of the write region is not dumped. In step (g), the protected region contents and the dump point file contents are dumped sequentially. The dumped protected regions are then removed from the protected regions, and the dump point file is deleted after the dump processing is completed. After the dump processing, the state of step (a) is substantially resumed for a next dumping operation.

According to the invention, as outlined above, the dump volume can be reduced and, even if an update or data write operation occurs during the dumping, the contents of the region in the memory that is managed as a protected region at the start of the dumping can be dumped completely by way of the dump point file.

Figure 2:
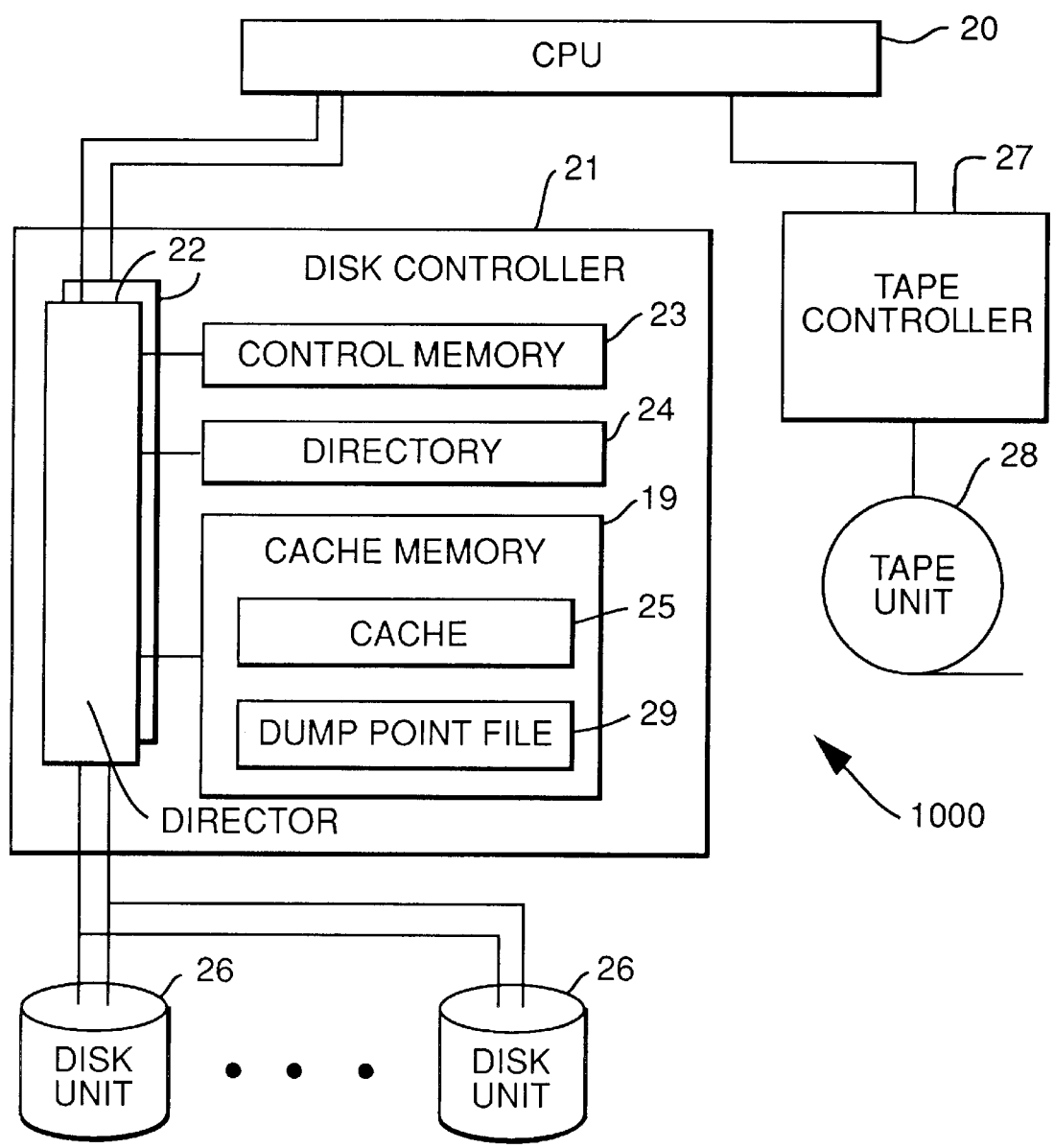
FIG. 2 is a schematic diagram illustrating the overall arrangement of the information processing system of the first embodiment of the invention.

FIG. 2 shows an overall arrangement of an information processing system 1000, which is arranged according to a first preferred embodiment of the invention.

The information processing system 1000 has a central processing unit (CPU) 20, at least one disk unit 26 serving as a dump source, a disk controller 21 connected between the CPU 20 and the disk unit 26, a tape unit serving as a dump destination, and a tape controller 27 connected between the CPU 20 and the tape unit 28.

The disk controller 21 has a control memory 23, a cache memory 19,.a directory 24 for storing management information of the cache memory 19, and at least one director 22 for operating the control memory 23, the directory 24, and the cache memory 19 and for controlling the data transfer. The cache memory 19 includes both a cache 25 for temporarily holding data loaded from the disk unit 26 and a dump point file 29. It should be noted that a storage region of the cache memory 19 is equally divided into cache slots, each being capable of storing data for one track as will be explained in greater detail hereinafter.

Figure 3:
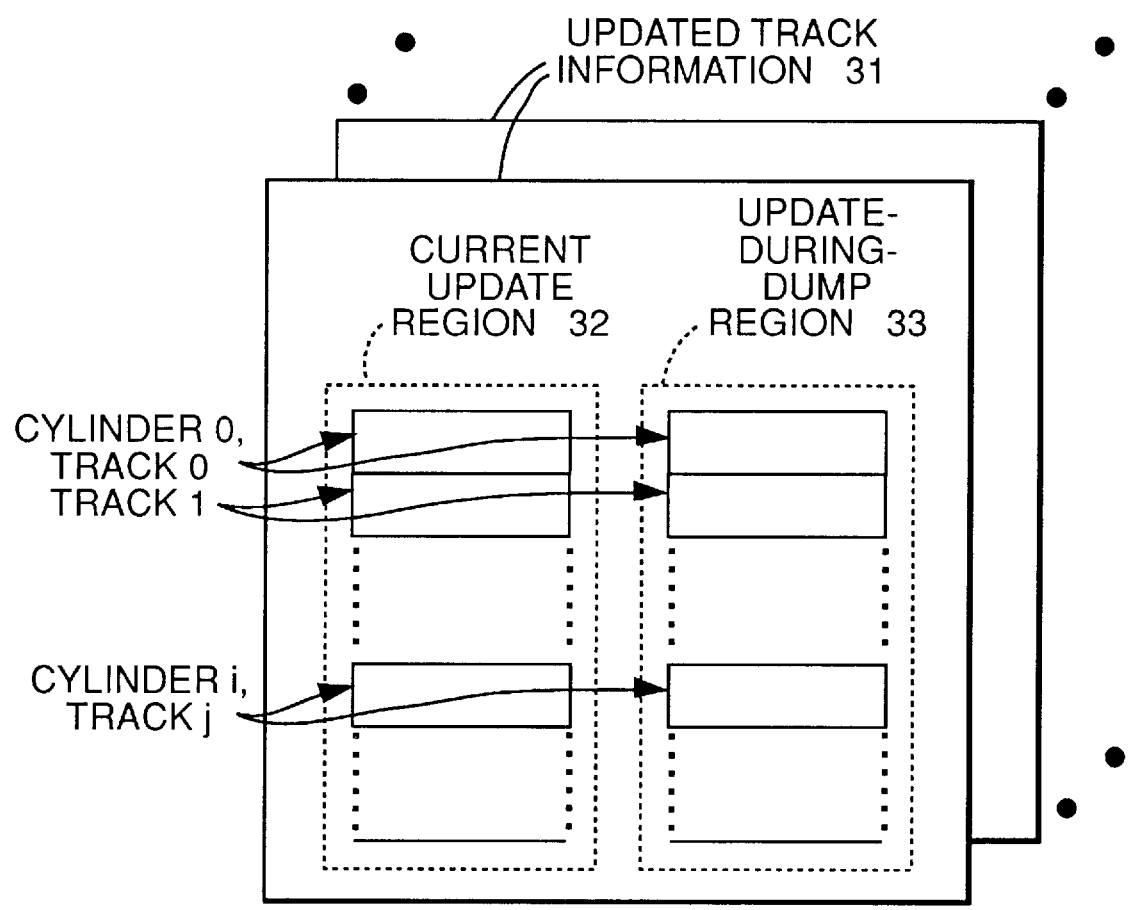
FIG. 3 is a diagram illustrating the contents of the control memory.

FIG. 3 shows the contents of the control memory 23. The control memory 23 stores, for each disk unit 26, updated track information 31 composed of a current update region 32 and an update-during-dump region 33. The current update region 32 indicates, for each track, whether an update operation has taken place in a previous period of time between the start of the last dump operation and the time when a current dump operation is started. "On" <1> indicates that the update operation has taken place during the previous period for a corresponding track, while "off" <0> indicates that no update operation has taken place. The update-during-dump region 33 indicates, for each track, whether an update operation has taken place during the dumping. "On" <1> indicates that the update operation has taken place during dumping, while "off" <0> indicates that no update operation has taken place during dumping.

If a non-volatile memory is used for the control memory 23, an updated track can be surely stored without being affected by a power outage or a planned stop of operation. This in turn makes it possible to dump a track on which an update operation has been performed after starting of a last dump up to the starting of a current dump, even if the dump operation is interrupted by a power outage or planned stop.

Figure 4:
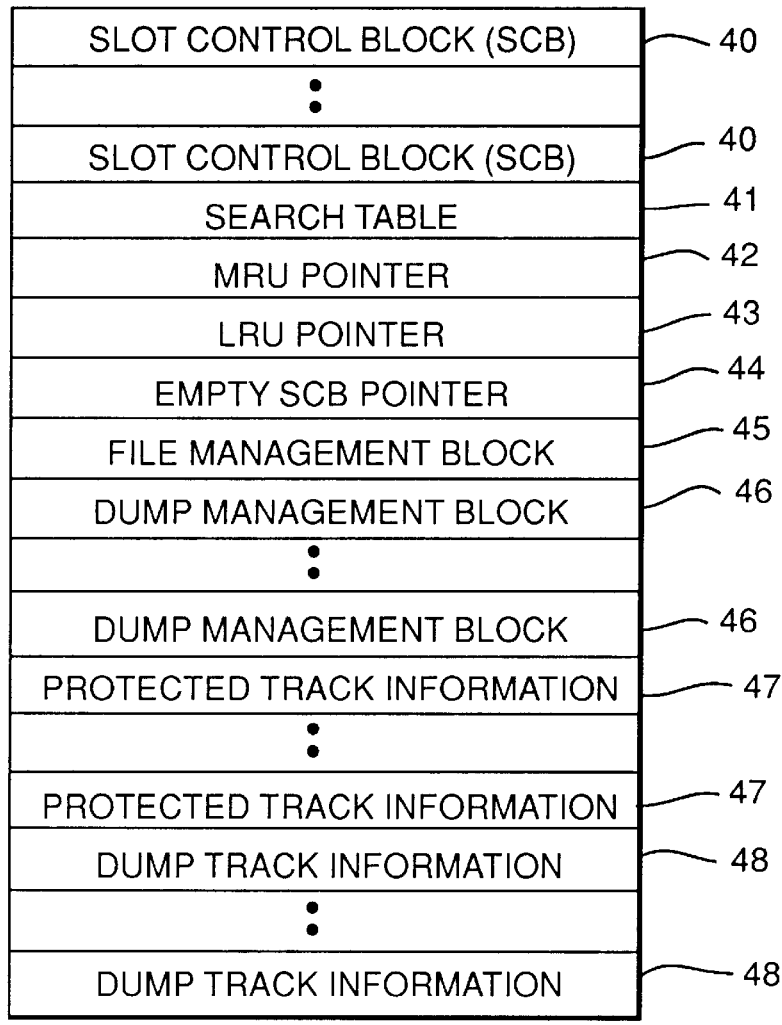
FIG. 4 is a diagram illustrating the contents of the directory.

FIG. 4 shows the contents of the directory 24. The directory 24 is composed of a slot control block (SCB) 40, a search table 41, an MRU (Most Recently Used) pointer 42, an LRU (Least Recently Used) pointer 43, an empty SCB pointer 44, a file management block 45, a dump management block 46, a protected track information area 47, and a dump track information area 48.

The SCBs 40 provide information for managing the cache slots in the cache memory 19. Each SCB 40 corresponds to a respective cache slot as will be described in greater detail hereinafter with reference to FIG. 5. The search table 41 is provided for each disk unit 26 to identify a disk number, a cylinder number, and a track number whose contents are held in the cache 25. The search table 41 will be described in greater detail hereinafter with reference to FIG. 6. The MRU pointer 42 points at the SCB 40 corresponding to a cache slot which holds the data of a track subjected to the most recent input/output operation. The LRU pointer 43 points at the SCB 40 corresponds to a cache slot which holds data of a track subjected to the least recent input/output operation. The empty SCB pointer is a pointer for chaining SCBs 40 corresponding to empty cache slots. The file management block 45 provides information for managing the dump point file 29 and will be described in greater detail hereinafter with reference to FIG. 7. The dump management blocks 46 point at the protected track information area 47 and the dump track information area 48 and will be described in detail hereinafter with reference to FIG. 8. The protected track information 47 provides information about a protected track whose contents must be stored. The information in dump track information area 48 is used to specify the tracks to be dumped, that is only those tracks which are inside a dump portion and for which an update operation has been performed in the previous time period set forth above.

Figure 5:
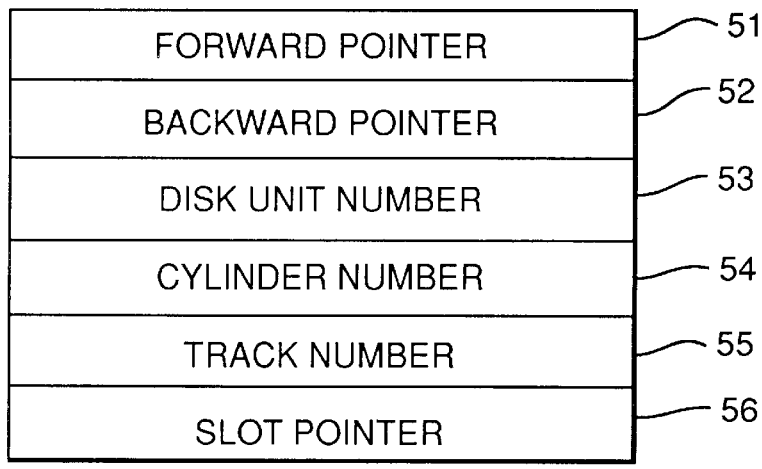
FIG. 5 is a diagram illustrating the contents of the SCB.

FIG. 5 shows the constitution of the SCB 40 in the directory 24. A forward pointer 51 and a backward pointer 52 are used to chain one SCB 40 to another for queue management. A disk unit number 53 is a number of a disk unit whose contents are stored in the corresponding cache slot in the cache memory 19. However, when the disk unit number 53 is <null>, i.e. when the SCB 40 is empty, i.e., a corresponding cache slot is empty. A cylinder number 54 and a track number 55 are numbers of a cylinder and a track whose contents are stored in the cache slot to which the SCB 40 correspond. A slot pointer 56 points at a corresponding cache slot.

Figure 6:
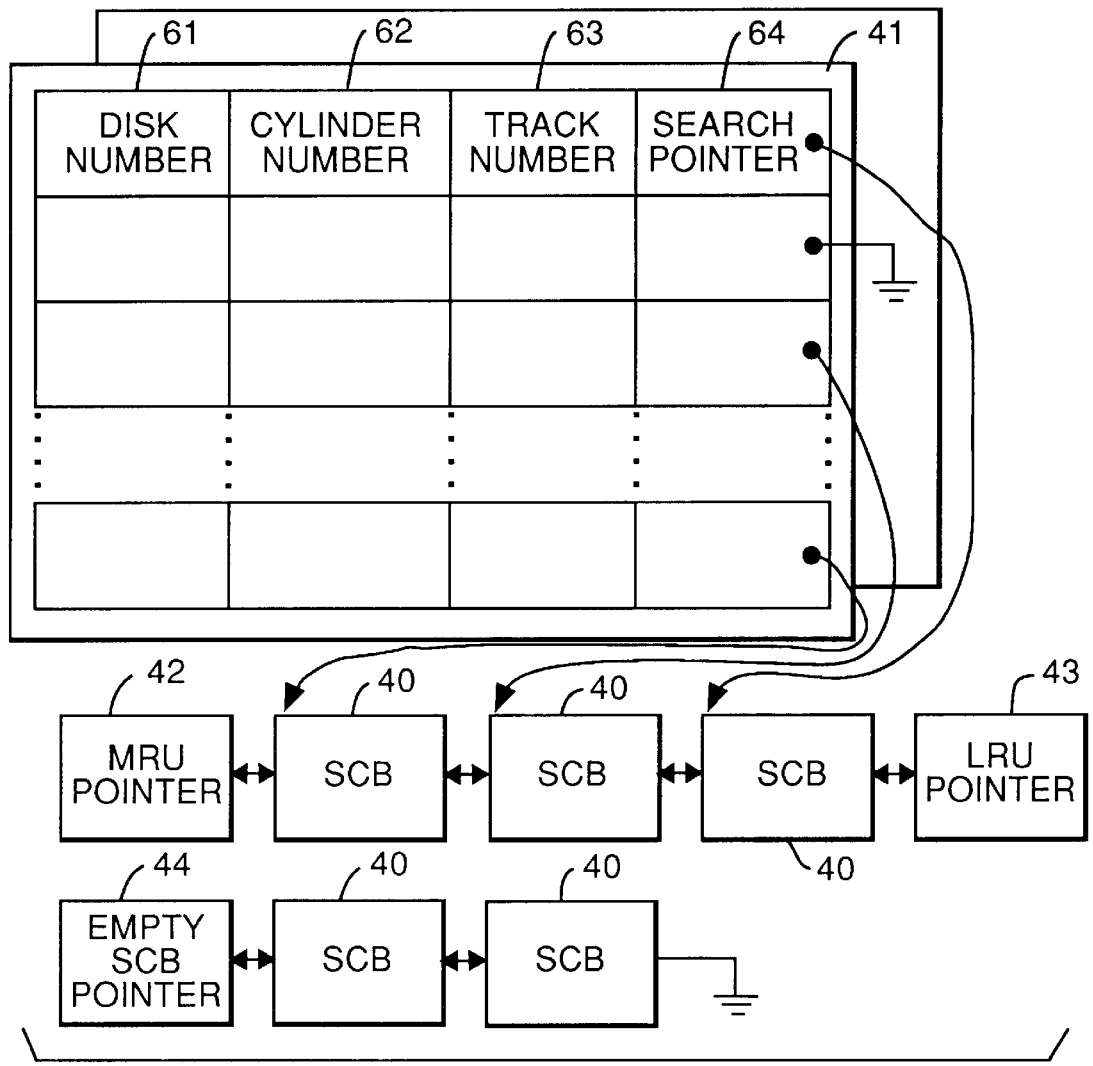
FIG. 6 is a diagram illustrating the relation of the search table.

FIG. 6 shows the contents of the search table 41 in the directory 24. The search table 41 is composed of a disk number 61, a cylinder number 62, track number 63, and a search pointer 64 for pointing at the SCB 40 corresponding to a cache slot in which the contents specified thereby are stored. If the contents specified by the disk number 61, cylinder number 62, and track number 63 are not stored in the cache 25, the search pointer 64 is set to <null>.

As shown in FIG. 6, the SCBs 40 that are not empty are chained with each other by means of the forward pointer 51 and the backward pointer 52 of each SCB, wherein the SCB chain starts with the MRU pointer 42 and terminates with the LRU pointer 43. On the other hand, empty SCBs 40 are chained with each other by means of the forward pointer 51 and the backward pointer 52 of each SCB, wherein the empty SCB chain starting with the empty SCB pointer 44.

Figure 7:
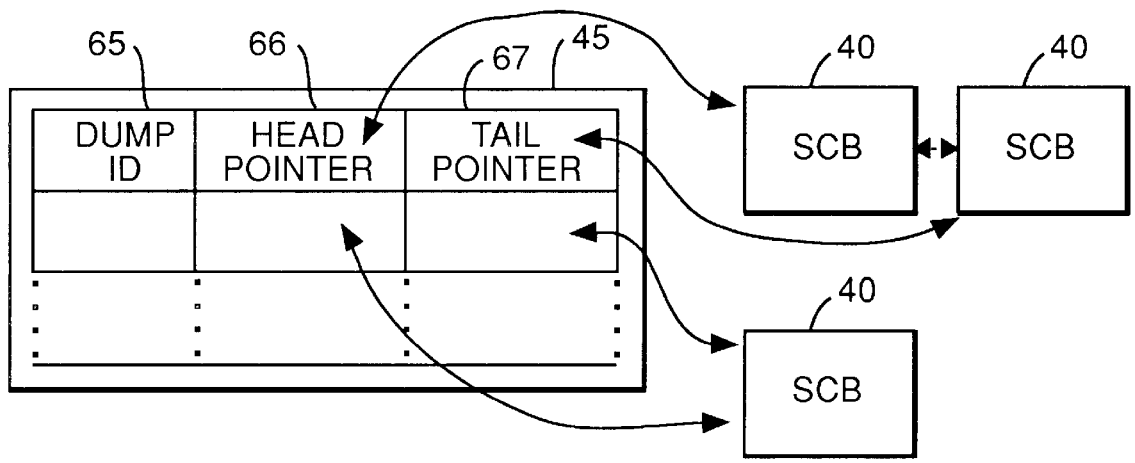
FIG. 7 is a diagram illustrating the relation of the file management block.

FIG. 7 shows the contents of the file management block 45 in the directory 24. The file management block 45 stores a head pointer 66 and a tail pointer 67 for each dump ID 65. SCBs 40 corresponding to cache slots which compose a dump point file are chained by means of the forward pointer 51 and the backward pointer 52 of each SCB 40. The head pointer 66 points at the head SCB 40 of the chain and the tail pointer 66 points at the tail SCB 40 of the chain. It should be noted that the dump ID 65 is provided by the CPU 20 according to a dump portion. When an entry is empty, the dump ID 65 is set to <null>.

Figure 8:
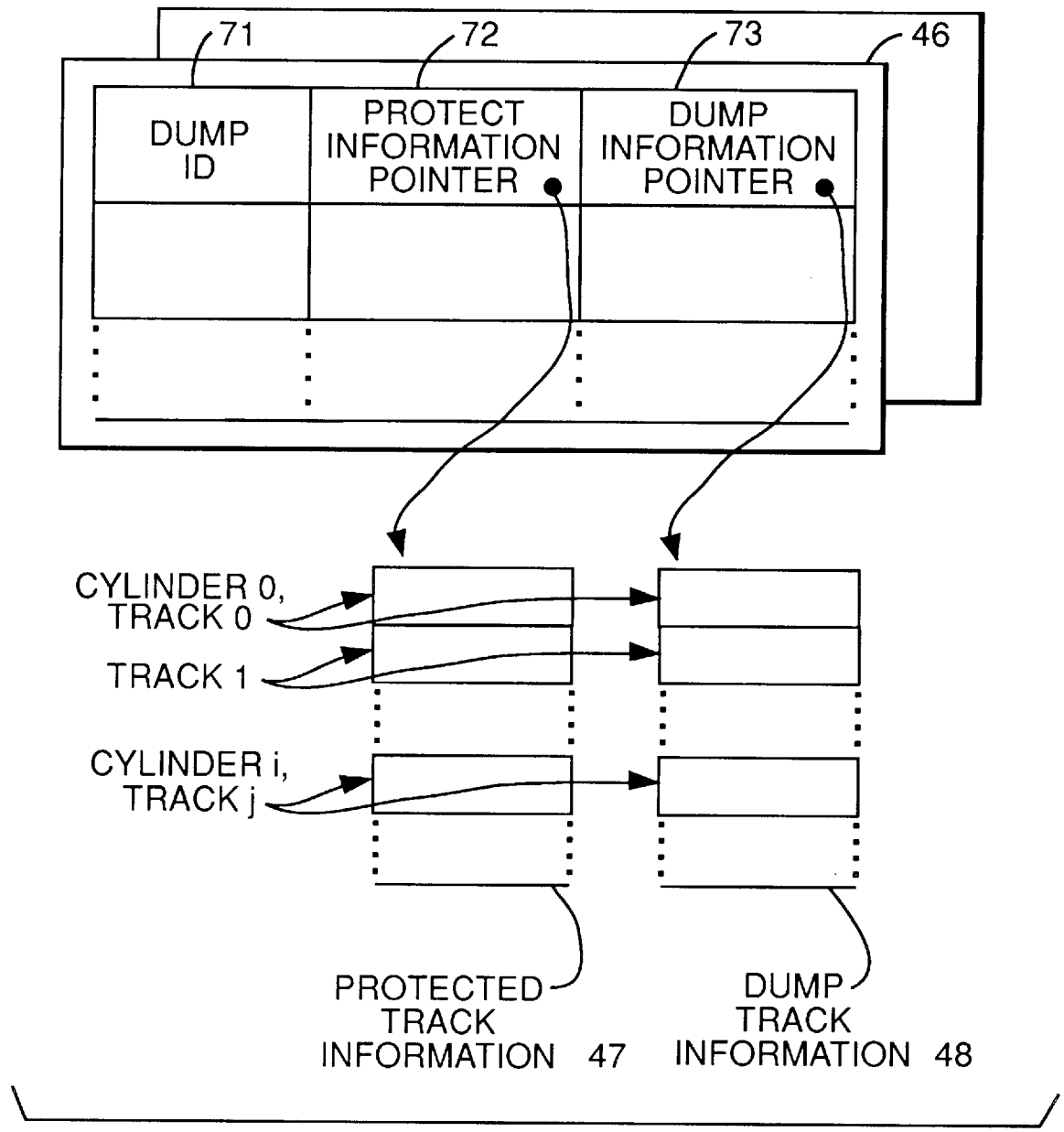
FIG. 8 is a diagram illustrating the relation of the dump management block.

FIG. 8 shows the contents of the dump management block 46 in the directory 24. The dump management blocks 46 are provided for each disk unit. The dump management block 46 stores a protect information pointer 72 for the protected track information area 47 and a dump information pointer 73 for the dump track information area 48 for each dump ID 71. The protected track information area 47 is bit map for indicating whether each track is a protected track or not. "On" <1> indicates a protected track, while "off" <0> indicates an unprotected track. The dump track information area 48 is a bit map for indicating whether each track is to be dumped or not. "ON" <1> indicates that the track is to be dumped, while "OFF" <0> indicates that the track is not going to be dumped, i.e. the track has already been dumped or is not inside a dump portion.

Figure 9:
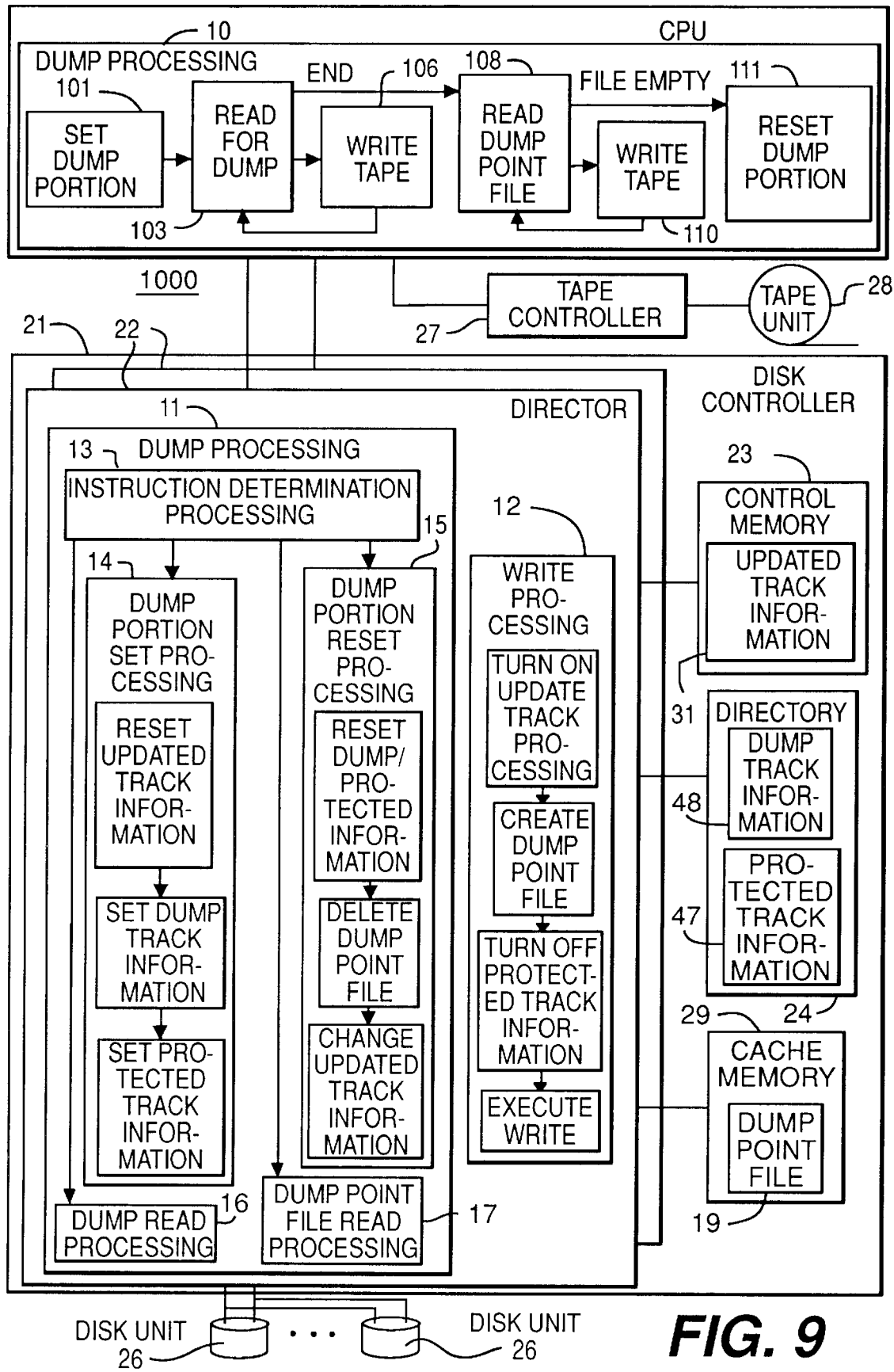
FIG. 9 is a schematic diagram illustrating the operation of the information processing system of FIG. 1.

FIG. 9 shows a schematic diagram of the operations of the information processing system 1000. The CPU 20 executes the dump processing 10. Each director 22 of the disk controller 21 executes the dump processing 11 and write processing 12. As shown in FIG. 9, the dump point file 29 is provided in a part of the storage region of the cache memory 19.

Figure 10:
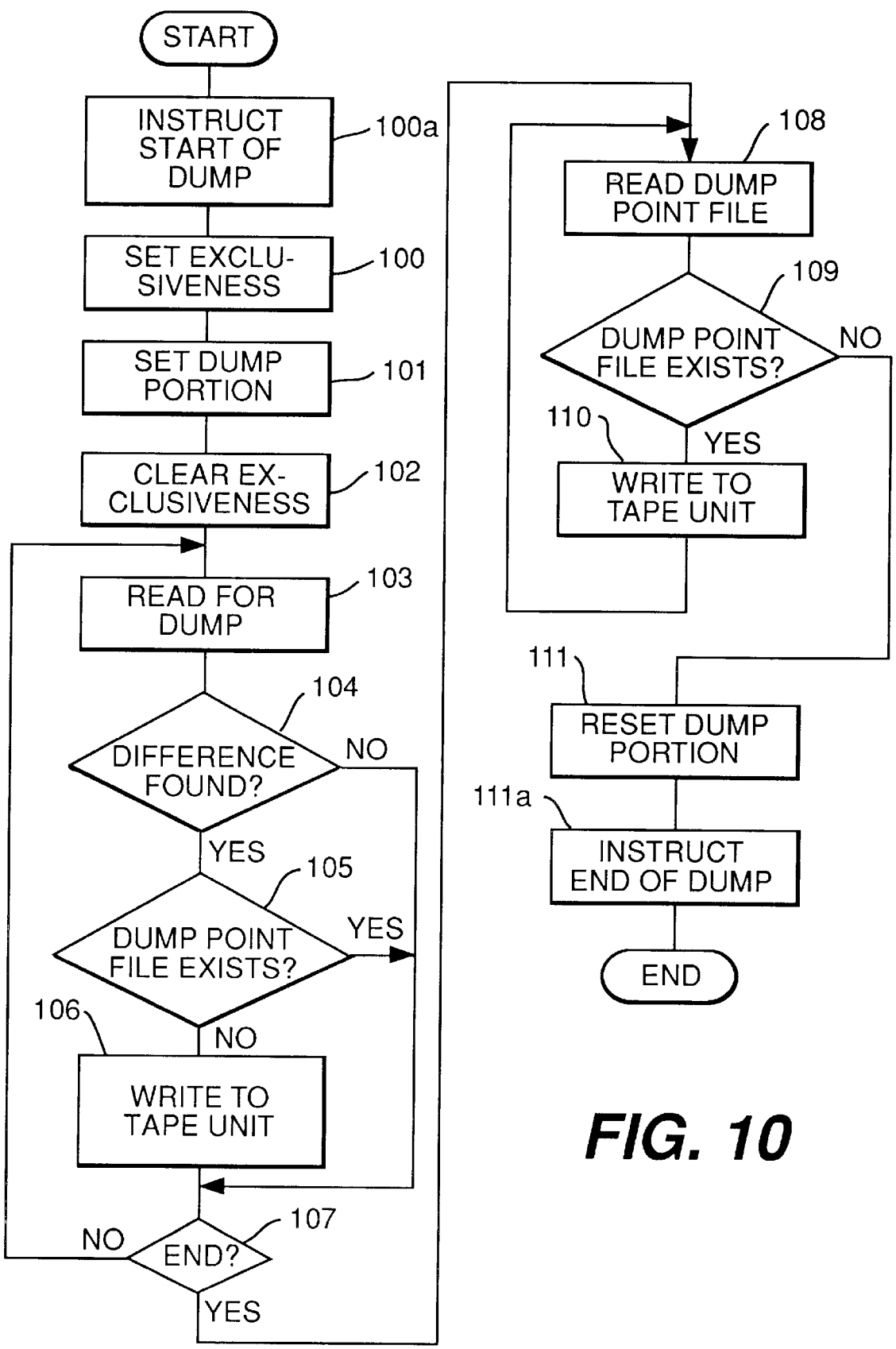
FIG. 10 is a flowchart showing the dump portion processing performed in the information processing system of FIG. 1.

FIG. 10 is a flowchart showing the dump processing 10 to be performed by the CPU 20. Reference numerals of the functions of the CPU 20 in FIG. 9 correspond to the step numbers of FIG. 10.

In step 100a, the CPU 20 issues a "start dump" instruction to the disk controller 21 to start a dump operation. The CPU 20 designates a dump ID with the start dump instruction. In step 100, the CPU puts a region of the dump portion on the disk unit 26 in an exclusive state. This prevents the disk unit from being affected by an update caused by a transaction generated during manipulation of the update information by the disk controller 21. In step 101, the CPU 20 issues a "set dump portion" instruction to the disk controller 21. The set dump portion instruction includes the dump ID, and a dump portion start position and a dump portion end position as the information specifying the dump portion. The dump portion is a physical region of the disk unit, such as the disk unit in its entirety, a track, a cylinder, and sets thereof that are to be dumped. Alternatively, the dump portion may indicate a physical region of the disk unit or a logical file managed by the CPU 20. This instruction may be made in a single session or divided into a plurality of sessions. A same dump portion may be specified duplicately.

In step 102, the CPU 20 clears the exclusive state set in step 100.

In step 103, the CPU issues a "dump read" instruction to the disk controller 21. The dump ID and a track to be read for dumping are designated with the dump read instruction. In step 104, the CPU 20 receives a report "difference found/not found" from the disk controller 21. If there is a difference, the CPU 20 goes to step 105; if not, the CPU goes to step 107. Generally, there is a difference if an update has been made for a track in the previous time period, i.e. the period of time between the starting of a last dump and the starting of a current dump. There is no difference if no update has been made. In step 105, the CPU receives a report on "whether a dump point file 29 storing the contents of a track to be read for dumping exists or not." If such a dump point file does not exist, the CPU 20 receives the contents of the track to be read for dumping and goes to step 106. If such a dump point file exists, the CPU 20 goes to step 107. In step 106, the CPU 20 writes the contents of the track received from the disk 26 to the tape unit 28. In step 107, the CPU 20 checks whether the operations in steps 103 through 106 have all been performed on all tracks within the dump portion. If the operations have all been performed, the CPU 20 goes to step 108; if not, the CPU 20 goes back to step 103.

In step 108, the CPU 20 issues a "read dump point file" instruction to the disk controller 21. The read dump point file instruction includes a dump ID. In step 109, upon receiving the contents of a track to be dumped in the dump point file 29 from the disk controller 21, the CPU 20 goes to step 110. Upon receiving a report that "the dump point file is empty," the CPU 20 goes to step 111. In step 110, the CPU 20 writes the received contents of the track to the tape unit 28 and then goes back to step 108 to dump the next contents. In step 111, the CPU 20 issues a "reset dump portion" instruction to the disk controller 21. The CPU 20 designates the dump ID and the dump portion the way as with the above-mentioned "set dump portion" instruction. In step 111a, the CPU 20 issues an "end dump" instruction to the disk controller 21. This instruction includes the same information as the above-mentioned "start dump" instruction.

Figure 11:
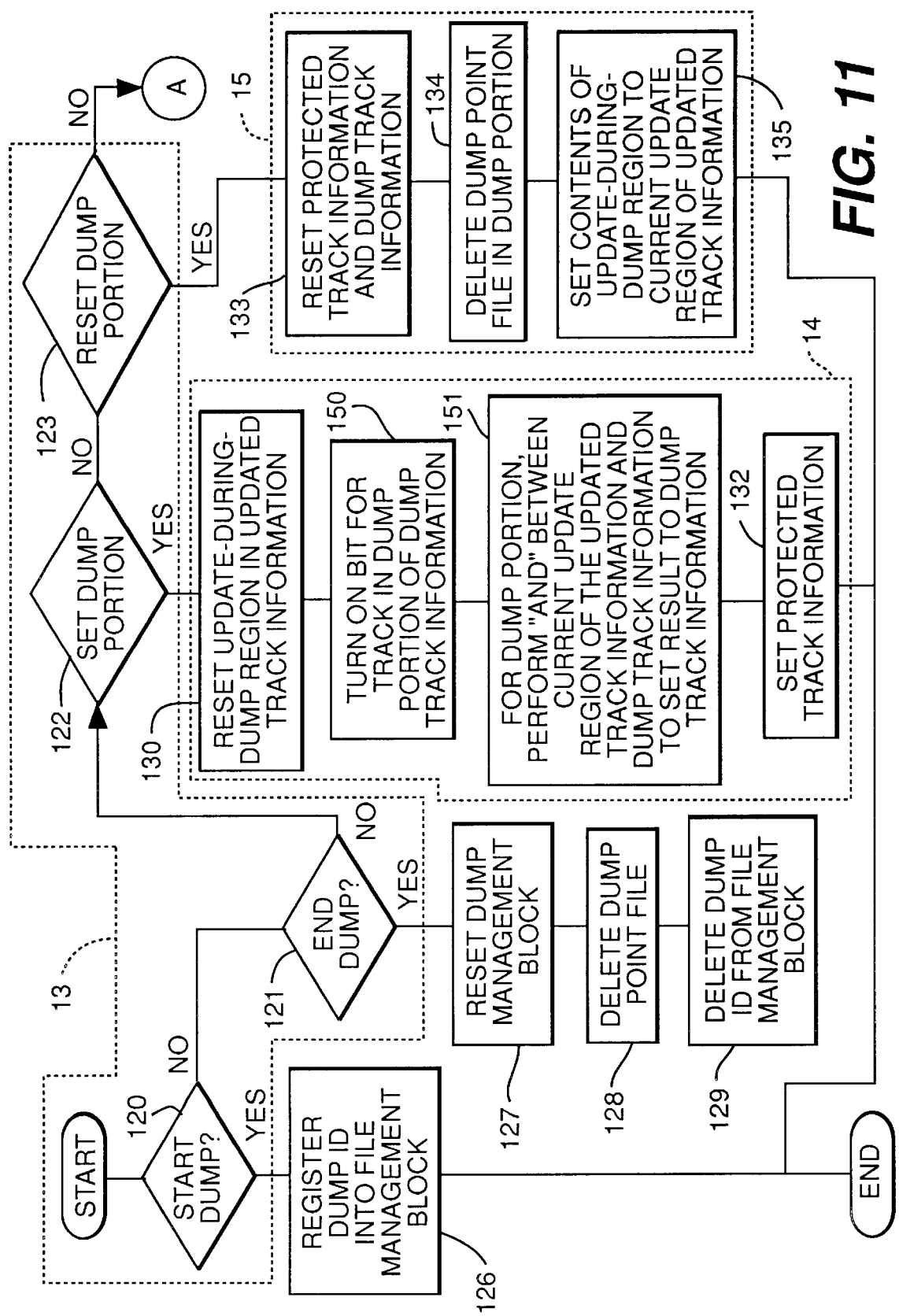
FIG. 11 is a flowchart showing the dump processing in the information processing system of FIG. 1.
Figure 12:
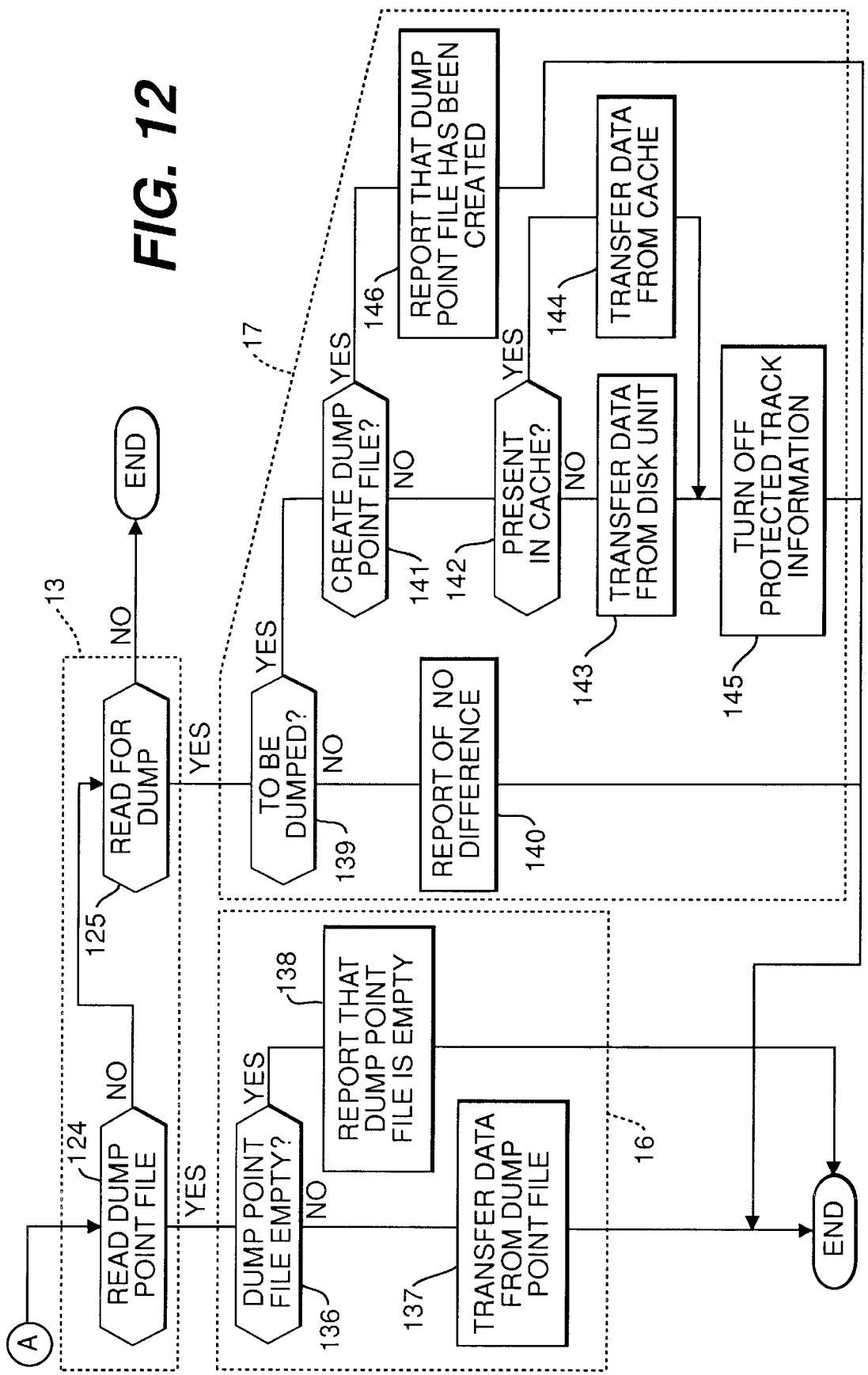
FIG. 12 is a flowchart continuing with the flow of the processing shown in the flowchart of FIG. 11.

FIGS. 11 and 12 are flowcharts showing the dump processing 11 to be performed by the director 22 of the disk controller 21. In the figures, reference numerals for steps enclosed by dotted lines correspond to the reference numerals of functions of the director 22 in FIG. 9. The flow charts are joined by the circled letter "A", as shown.

In steps 120 through 125, instruction determination processing 13 is performed to interpret the instructions issued by the CPU 20. In step 120, the director 22 determines whether the instruction is a "start dump" instruction or not.

If the instruction is not "start dump", the director 22 goes to step 121; if the instruction is "start dump", then the director 22 goes to step 126. In step 121, the director 22 determines whether the instruction is "end dump" or not. If the instruction is not "end dump", the director 22 goes to step 122; if the instruction is "end dump", then the director 22 goes to step 127. In step 122, the director 22 determines whether the instruction is "set dump portion" or not. If the instruction is not "set dump portion", the director 22 goes to step 123; if the instruction is "set dump portion", then the director 22 goes to step 130. In step 123, the director 22 determines whether the instruction is "reset dump portion" or not. If the instruction is not "reset dump portion", the director 22 goes to step 124; if the instruction is "reset dump portion", the director 22 goes to step 133. In step 124, the director 22 determines whether the instruction is "read dump point file" or not. If the instruction is not "read dump point file", the director 22 goes to step 125; if the instruction is "read dump point file", the director 22 goes to step 136. In step 125, the director 22 determines whether the instruction is "read for dump" or not. If the instruction is not "read for dump", the director 22 ends the dump processing 11; if the instruction is "read for dump", the director 22 goes to step 139.

If the instruction is determined to be "start dump", in step 126 the director 22 registers the dump ID designated by the instruction into an empty entry of the dump ID entries 65 in the file management block 45. Then, the director 22 ends the dump processing 11.

If the instruction is "end dump" as a result of the determination of step 121, in step 127, the director 22 resets the information of the dump management block 46. To be more specific, the director 22 determines whether or not a dump ID 71 matching the dump ID designated by the end dump instruction exists in the dump management block 46. If such a dump ID 71 is found, the director 22 traces the protect information pointer 72 and the dump information pointer 73, which correspond to the dump ID 71, to reference the protected track information 47 and the dump track information 48 and turn off <0> all bits. Then, the director 22 sets the disk dump ID 71 to <null>. In step 128, the director 22 deletes the dump point file 29. To be more specific, the director 22 determines file management block 45 to find a dump ID 65 which is coincident with the dump ID designated by the end dump instruction. If such a dump ID 65 is found, the director 22 releases the SCBs 40 in the SCB chain pointed to by the head pointer 66 corresponding to the dump ID 65. The director 22 releases the SCBs 40 by executing the following process until all of the SCBs 40 are released. The director 22 replaces the head pointer 66 with the backward pointer 52 of the head SCB 40 in the chain, sets the disk unit number 53 of the head SCB 40 to <null>, and chains the head SCB 40 to the empty SCB chain pointed to by the empty SCB pointer 44. After releasing the SCBs 40, in step 129, the director 22 sets the dump ID 65 in the file management block 45 to <null>, and releases the dump ID. Then, the director 22 ends the dump processing 11.

Steps 130, 150, 151, and 132 are process steps executed in the dump portion set processing 14. The dump portion set processing 14 is executed in response to the set dump portion instruction. In step 130, for the tracks in a dump portion, the director 22 writes "OFF" <0> to the entirety of the update-during-dump region of the updated track information 31 included in the dump portion in order to reset the update-during-dump region 33. In step 150, the director 22 looks over the dump management block 46 to find a dump ID 75 which is coincident with the dump ID designated by the CPU 20. If the dump ID 71 is found, the director 22 fetches the dump track information 48 corresponding to the dump ID 71. Then, the director 22 turns to ON <1> the bits, which correspond to the tracks comprised in the dump portion designated by the CPU 20, in the fetched dump track information area 48. In step 151, for the tracks inside the dump portion, the director 22 stores, as a new bit of the dump track information 48, a result of a logical AND operation performed between the bit of the current update region 32 of the updated track information area 31 and the bit of the dump track information area 48. This makes it possible to register, as tracks to be dumped, only those tracks which are inside the dump portion and have been updated between the beginning of the last dump processing and the beginning of the current dump processing, i.e. the previous time period. In step 132, the director 22 replaces the bit of the protected track information 47 with the bit of the dump track information 48. Then, the director 22 ends the dump processing 11.

Steps 133 through 135 are process steps executed in the dump portion reset processing 15. The dump portion reset processing 15 is executed when the instruction determined to be a reset dump portion instruction as a result of the determination made in step 123. In step 133, the director 22 resets the protected track information 47 and the dump track information 48. To be more specific, the director 22 looks over the dump management block 46 to find a dump ID 71 which is coincident with the dump ID designated by the "reset dump portion" instruction. If such a dump ID 71 is found, the director 22 traces the protect information pointer 72 and the dump information pointer 73, each corresponding to the dump ID 71, to fetch the protected track information 47 and the dump track information 48. Then, the director 22 turns to OFF <0> the bit corresponding to the tracks that has been taken out of the dump portion. In step 134, the director 22 deletes the contents of the tracks taken out of the dump portion from the dump point file 29. To be more specific, the director 22 looks over the file management block 45 to find a dump ID 65 coincident with the dump ID designated by the CPU 20. Then, the director 22 sequentially traces the chain starting from the SCB 40 pointed by the head pointer 66 corresponding to the dump ID 65, and remove the SCBs 40 corresponding to the cache slots which store the contents of the tracks taken out of the dump portion from the chain. At the same time, the director 22 sets the disk unit number 53 of the removed SCBs 40 to <null>, and chains the removed SCBs 40 to the empty SCB chain pointed by the empty SCB pointer 44. In step 135, for the tracks taken out of the dump portion, the director 22 replaces the bit of the current update region 32 of the updated track information 31 with the bit of the update-during-dump region 33. This step allows the track updated during dumping to be dumped next. Then, the director 22 ends the dump processing 11.

Steps 136 through 138 are steps executed in the dump point file read processing 16. The dump point file read processing 16 is executed when the instruction is determined to be a read dump point file instruction as a result of the determination made in step 124. In step 136, the director 22 looks over the file management block 45 and finds a dump ID 65 which is coincident with the dump ID designated by the CPU 20. If the head pointer 66 corresponding to the dump ID 65 coincident with designated dump ID is not <null>, the director 22 goes to step 137. If the head pointer 66 is <null>, then the director 22 determines that the dump point file is empty and goes to step 138. In step 137, the director 22 transfers, from the dump point file 29 to the CPU 20, the contents of the track stored in cache slot corresponding to the SCB 40 pointed to by the head pointer 66 corresponding to the dump ID 65. The director 22 removes this SCB 40 from the chain pointed to by the head pointer 66 upon completion of the transfer. For this purpose, the director 22 replaces the head pointer 66 with the backward pointer 52 of the SCB 40 to be removed, sets the disk unit number 53 of this SCB 40 to <null>, and chains this SCB 40 to the empty SCB chain pointed by the empty pointer 44. Thereafter, the director 22 terminates the dump processing 11. In step 138, the director 22 sends a report "dump point file empty" indicating that the dump point file 29 is empty to the CPU 20. Then, the director 22 ends the dump processing 11. In step 139, the director 22 determines whether the track designated by the CPU 20 is a track to be dumped or not. If the designated track is not a track to be dumped, the director 22 goes to step 140; if the designated track is a track to be dumped, the director 22 goes to step 141. To be more specific, the director 22 makes the determination based on the dump track information 48 corresponding to the dump ID instructed by the CPU 20. If the bit corresponding to the designated track is OFF <0>, the director 22 determines that the designated track is not a track to be dumped; if the bit is on <1>, the director 22 determines that the designated track is a track to be dumped. In step 140, the director 22 sends a report "difference not found" to the CPU 20 and ends the dump processing 11. In step 141, the director 22 determines whether the contents of the designated track are stored in dump point file 29 or not. If the contents of the designated track are not stored in the dump point file 29, the director 22 goes to step 142; if the contents are stored in the dump point file 29, the director 22 goes to step 146. To be more specific, the director 22 looks over the dump management block 46 to find the dump ID 71 which is coincident with the dump ID designated by the CPU 20. Then, the director 22 checks the bit corresponding to the designated track in the protected track information 47 corresponding to the dump ID 71 coincident with designated dump ID. If the bit corresponding to the designated is ON <1>, the director 22 determines that the dump point file 29 has not been created for the track (that is, the contents of the designated track have not been updated during dumping); if the bit is OFF <0>, the director 22 determines that the dump point file 29 has been created for the designated track (that is, the contents of the designated track have been updated during dumping). In step 142, the director 22 refers to the search table 41 and checks the search pointer 64 corresponding to the track designated by the CPU 20. If the search pointer 64 is <null>, the director 22 determines that the contents of the designated track are not stored in the cache 25 and goes to step 143; if the search pointer 64 is not <null>, the director 22 determines that the contents are stored in the cache 25 and goes to step 144. If the contents of the designated track are stored in cache 25, the director 22 transfers the contents of the designated track from the disk unit 26 to the CPU 20 in step 143 and goes to step 145. On the other hand, if the contents of the designated track are stored in cache 25, the director transfers the contents of the designated track from the cache 25 to the CPU 20 in step 144.

In step 145, based on the protected track information 47 and the dump track information 48, the director 22 sets the bit corresponding to the designated track to off <0> and ends the dump processing 11. If the director 22 determines that the contents of the designated track are stored in dump point file 29, in step 146, the director 22 sends a report "the dump point file has been created" to the CPU 20 and ends the dump processing 11.

Figure 13:
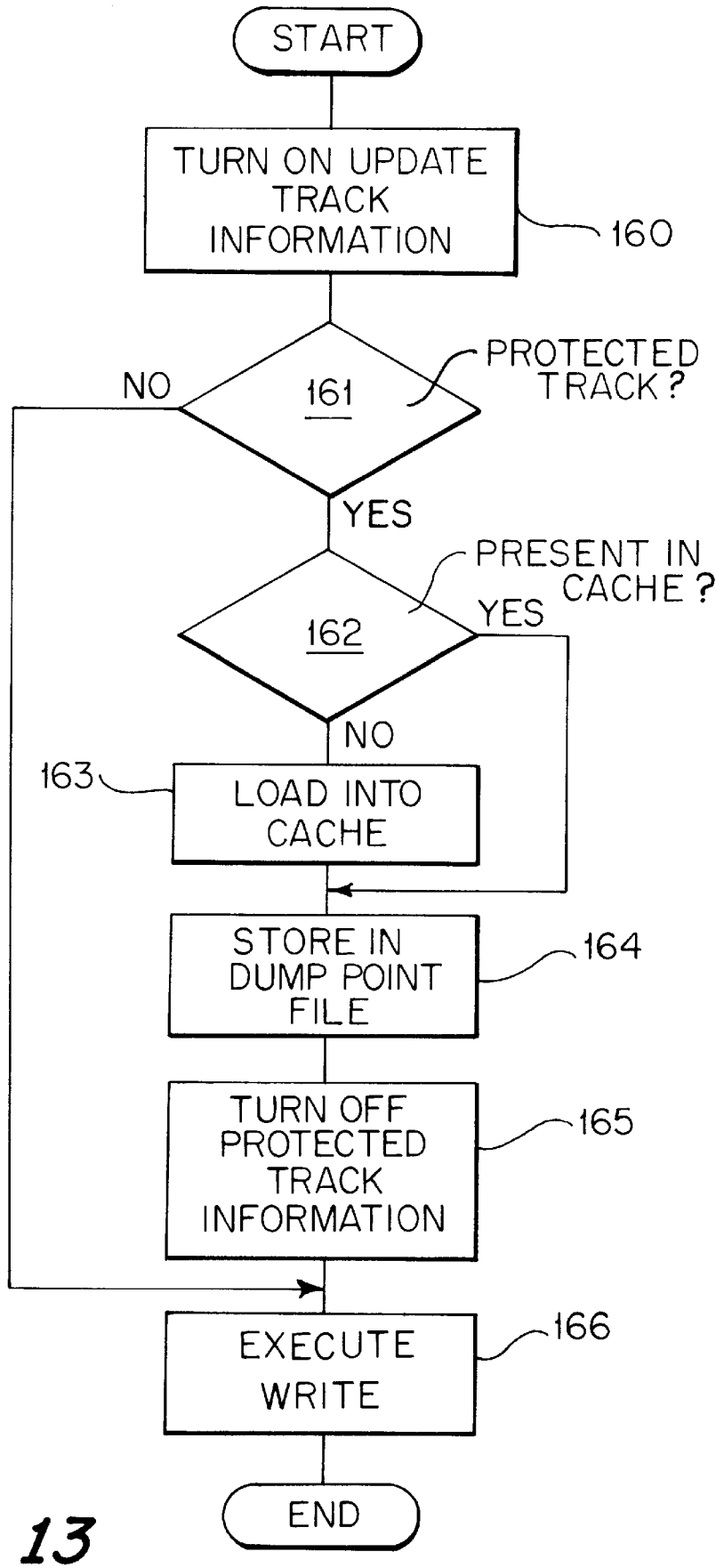
FIG. 13 is a flowchart showing the write processing in the information processing system of FIG. 1.

FIG. 13 is a flowchart showing the write processing 12 performed by the director 22 of the disk controller 21. In the write processing 12, the director 22 performs a write operation on the disk unit 26 in response to a write request issued by the CPU 20. In step 160, based on the updated track information 31, the director 22 turns ON <1> the bit in the current update region 32 corresponding to a write region and the bit in the update-during-dump region 33 corresponding to the write region. In step 161, the director 22 determines whether the write region includes a protected track or not. If the write region includes a protected track, the director 22 goes to step 162 to retain the contents of that protected track prior to the writing; if the write region does not include a protected track, the director 22 goes to step 166. To be specific, the director 22 fetches a valid dump ID 71 from the dump management block 46 corresponding to the disk unit to be written. Then the director 22 checks bits corresponding to tracks included in the write region in the protected track information area 47 which are pointed to by the protected information pointer 72 corresponding to the valid dump ID 71. If any of the bits corresponding to the track included in the write region is ON <1>, then the director 22 determines that the write region includes a protected track, otherwise, the director 22 determines that the write region does not include a protected track.

Steps 162 through 164 provide dump point file creating processing. In this processing, the director 22 stores the contents of a protected track included in the write region into the dump point file 29. In step 162, the director determines whether or not the contents of the protected tracks included in the write region are stored in the cache 25. If the contents of the protected track are not stored in the cache 25, the director 22 goes to step 163; if the contents are stored in the cache 25, the director 22 goes to step 164. To be specific, the director 22 checks the search pointer 64 of the search table 41 corresponding to the protected track (that is, it determines whether there is a match between the disk number 61, the cylinder number 62, and the track number 63 of the entry and that of the protected track). If the search pointer 64 is <null>, then the director 22 determines that the contents of the protected track are not stored in the cache 25, otherwise, the director 22 determines that the contents of the protected track are stored in the cache 25. In step 163, the director 22 assigns an SCB 40 to the protected track and loads the contents of the protected track into the cache 25.

In step 164, the director 22 stores the contents of the protected track into the dump point file 29. To be more specific, the director 22 fetches, from the dump management block 46 corresponding to the disk unit 26 on which the write operation is performed, a valid dump ID 71. Then, the director 22 checks the protect track information 42 pointed to by the protect information pointer 72 corresponding to the valid dump ID 71. If a bit corresponding to a track included in the write region is ON <1>, the director 22 assigns an SCB 40 to the protected track to copy the contents of the protected track prior to the writing from the cache 25 into the dump point file 29, that is, the cache slot corresponding to the assigned SCB 40. Then, the director 22 chains the assigned SCB 40 into the SCB chain pointed to by the head pointer 66 and the tail pointer 67 in the file management block 45. In step 165, the director 22 turns OFF <0> the bits corresponding to the tracks included in the write region in the protect track information 47 to remove them from the protected tracks. Consequently, when these tracks included in the write region are updated again, the dump point file 29 can be prevented from being overwritten with the contents prior to the update (that is, the contents at the starting of the dump operation are not lost). In addition, according to this process, it is possible to recognize that the dump point file 29 has been created in the dump processing. In step 166, the director 22 performs the write operation.

Figure 14:
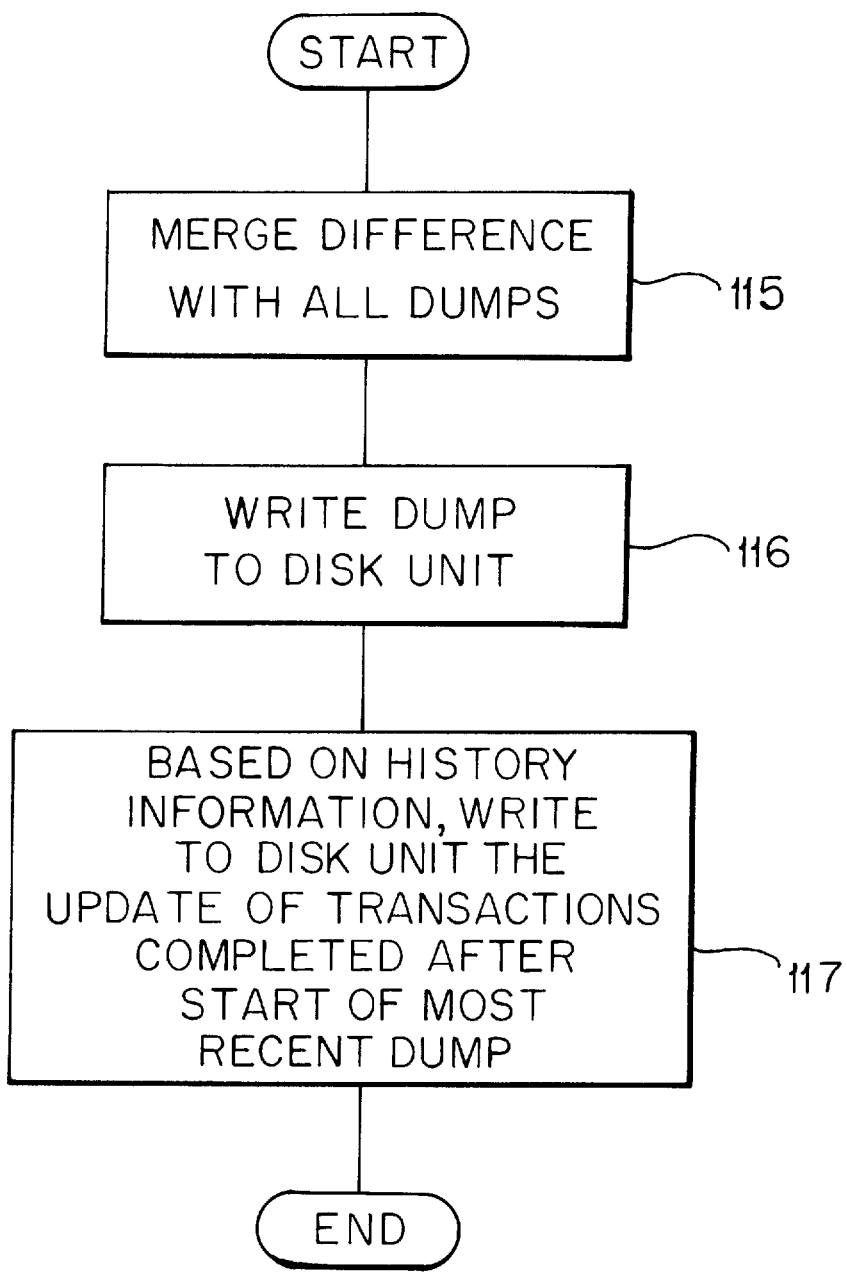
FIG. 14 is a flowchart showing the fault recovery processing in the information processing system of FIG. 1.

FIG. 14 is a flowchart showing a method in which a fault is recovered by the CPU 20. In step 115, the CPU 20 reads all of the dump contents from the tape unit 28 to merge the read contents with an updated portion (a difference) provided by the most recent dumping. This processing may be performed before troubleshooting. In step 116, the CPU 20 writes the merged contents back to the disk unit 26. In step 117, based on the dump history information, the CPU 20 writes to the disk unit 26 the updated contents of a transaction completed after the start of the most recent dumping operation.

According to the above-mentioned first embodiment of the invention, for a specified dump portion in the storage unit, a region updated between the starting of a last dump and the starting of a current dump is recognized as a protected region. When a write request comes after the starting of the current dump, if the write region includes the protected region, the contents of the protected region included in that write region are stored in the dump point file 29 prior to the writing. Then, the region subject to the write request is removed from the protected region. At the execution of the dumping operation, the contents belonging to the protected region are read from the storage unit to be transferred to the CPU. At the same time, the contents prior to the writing are transferred to the CPU 20 to be written to the tape unit 28. Thus, since a region to be dumped is restricted to a region that is inside the dump portion and that has been updated after the starting of the last dump, the dump volume can be reduced. If an undumped region has been updated during dumping, the contents of the region prior to the update are saved in the dump point file 29, thereby dumping the contents at the starting of the dumping without being lost. Further, if the contents at the starting of the dumping are stored in the cache, the contents are used to create the dump point file, thereby reducing the number of times access is made to the disk unit. The cache is also used at execution of the dumping, so that a data transfer rate can be increased. Still further, since the control memory, the directory, the cache, and the dump point file are preferably non-volatile, power outages or the like during dumping do not affect the dumping processing, which can be resumed upon power restoration.

Figure 15:
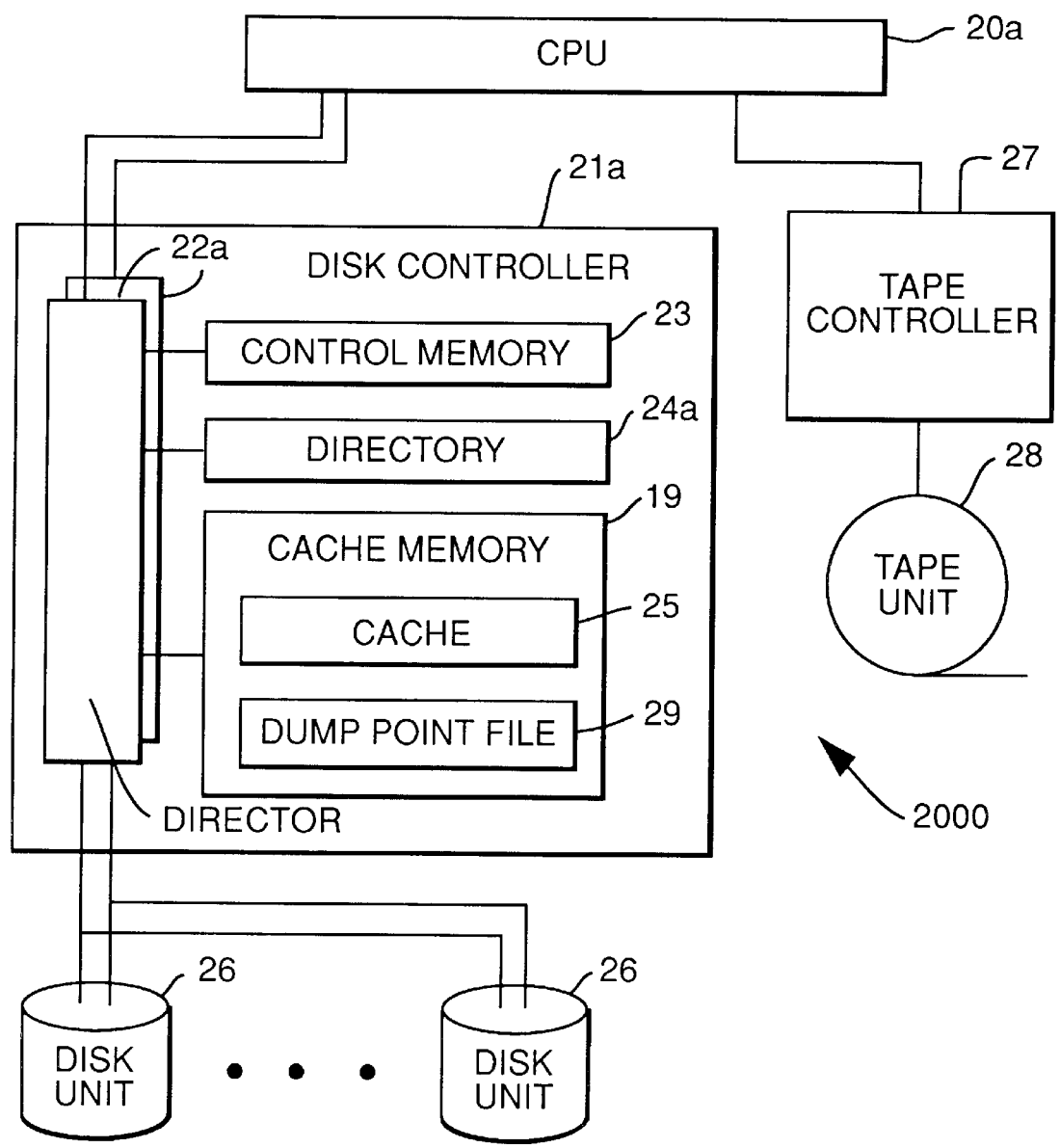
FIG. 15 is a schematic diagram illustrating an overall arrangement of an information processing system according to a second embodiment of the invention.

FIG. 15 shows an overall arrangement of an information processing system 2000 according to a second embodiment of the invention. The information processing system 2000 differs from the information processing system 1000 of the first embodiment in that a central processing unit (CPU) 20a, a director 22a and a structure of directory 24a of a disk controller 21a function differently. The information processing system 2000 also differs from the information processing system 1000 in that, with the first embodiment, the disk controller 21 determines whether a track to be read for dumping is a track to be dumped, while, in the second embodiment, the CPU 20a determines whether a track is to be dumped by reading the updated track information from a control memory 23 of the disk controller 21a and then notifying the disk controller 21a of the track to be dumped.

Figure 16:
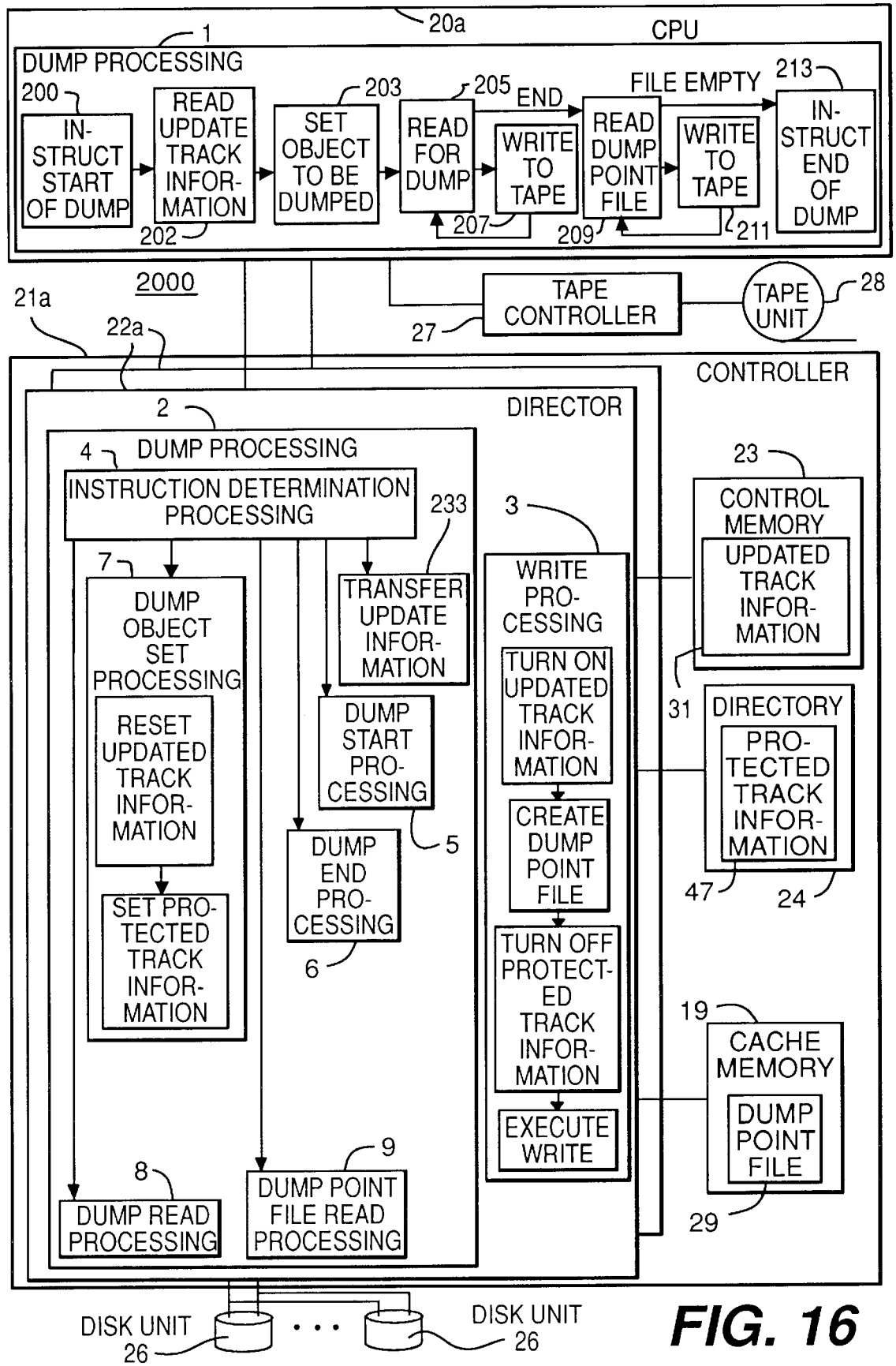
FIG. 16 is a schematic diagram illustrating operations of the information processing system of FIG. 15.

FIG. 16 shows a schematic diagram illustrating the operations of the information processing system 2000. The CPU 20a executes the dump processing 1. Each director 22a of the disk controller 21a executes dump processing 2 and write processing 3.

Figure 17:
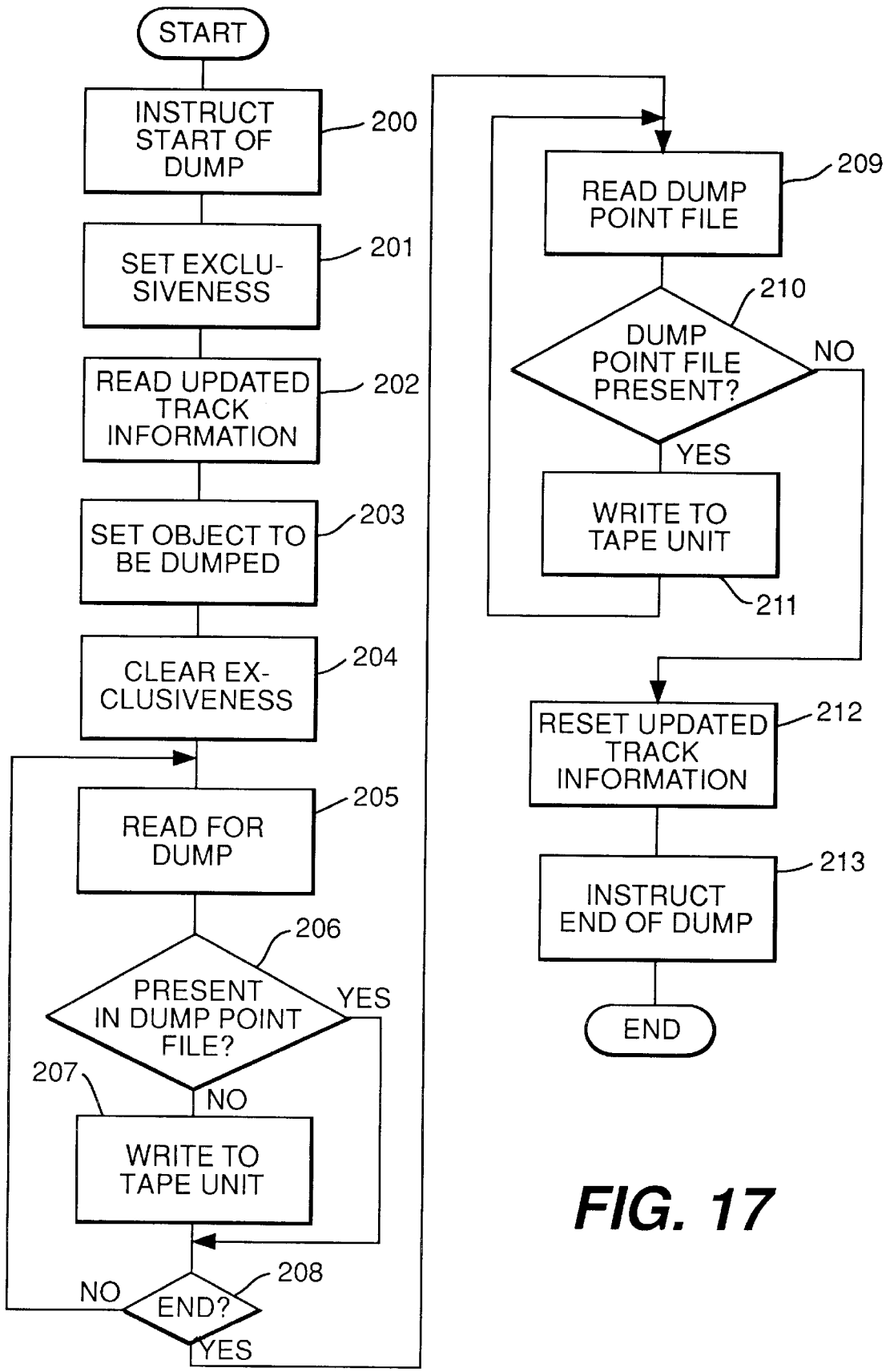
FIG. 17 is a flowchart showing the dump portion processing in the information processing system of FIG. 15.

FIG. 17 is a flowchart showing the dump processing 1 executed by the CPU 20a. Reference numerals of the functions of the CPU 20a in FIG. 16 correspond to the step numbers of FIG. 17.

In step 200, the CPU 20a issues a "start dump" instruction to the disk controller 21a. In step 201, the CPU 20a puts a region of a dump portion on the disk 26 in an exclusive state. In step 202, the CPU 20a issues a "read updated track information" instruction to the disk controller 31a and reads updated track information 31 (equivalent to that of FIG. 2) to identify a track to be dumped. In step 203, the CPU 20a determines the track to be dumped based on the read updated track information 31. To be more specific, the CPU 20a selects, as the track to be dumped, a track corresponding to the bit in the current update region 32 which is set on <1>. Then, by issuing a "set dump object" instruction, the CPU 20a indicates the track to be dumped to the disk controller 21a. In step 205, the CPU 20a issues a "dump read" instruction to the disk controller 21a. In step 206, the CPU 20a receives a report which indicates whether a dump point file 29 that stores the contents of the track to be read for dump exists or not from the disk controller 21a. If the disk controller 21a does not have such a dump point file, the CPU 20a receives the contents of the track to be read for the dump operation from the disk controller 21a and goes to step 207. If the dump point file 29 storing the contents exists in the disk controller 21a, the CPU 20a goes to step 208. In step 207, the CPU 20a writes the contents of the track to be read for the dumping to a tape unit 28. In step 208, the CPU 20a determines whether the above-mentioned steps 205 through 207 have been performed on all tracks to be dumped or not. If there is any track remaining unprocessed, the CPU 20a goes back to step 205, otherwise the CPU 20a goes to step 209. In step 209, the CPU 20a issues a "read dump point file" instruction to the disk controller 21a. In step 210, upon receiving the contents of the track to be dumped of the dump point file 29 from the disk controller 21a, the CPU 20a goes to step 211. Upon receiving the report "dump point file is empty", the CPU 20a goes to step 212. In step 211, the CPU 20a writes the received contents to the tape unit 28 and goes back to step 209. In step 212, the CPU 20a issues a "reset updated track information" instruction to the disk controller 21a to reset the updated track information 31. In step 213, the CPU 20a issues an "end dump" instruction to the disk controller 21a.

Figure 18A:
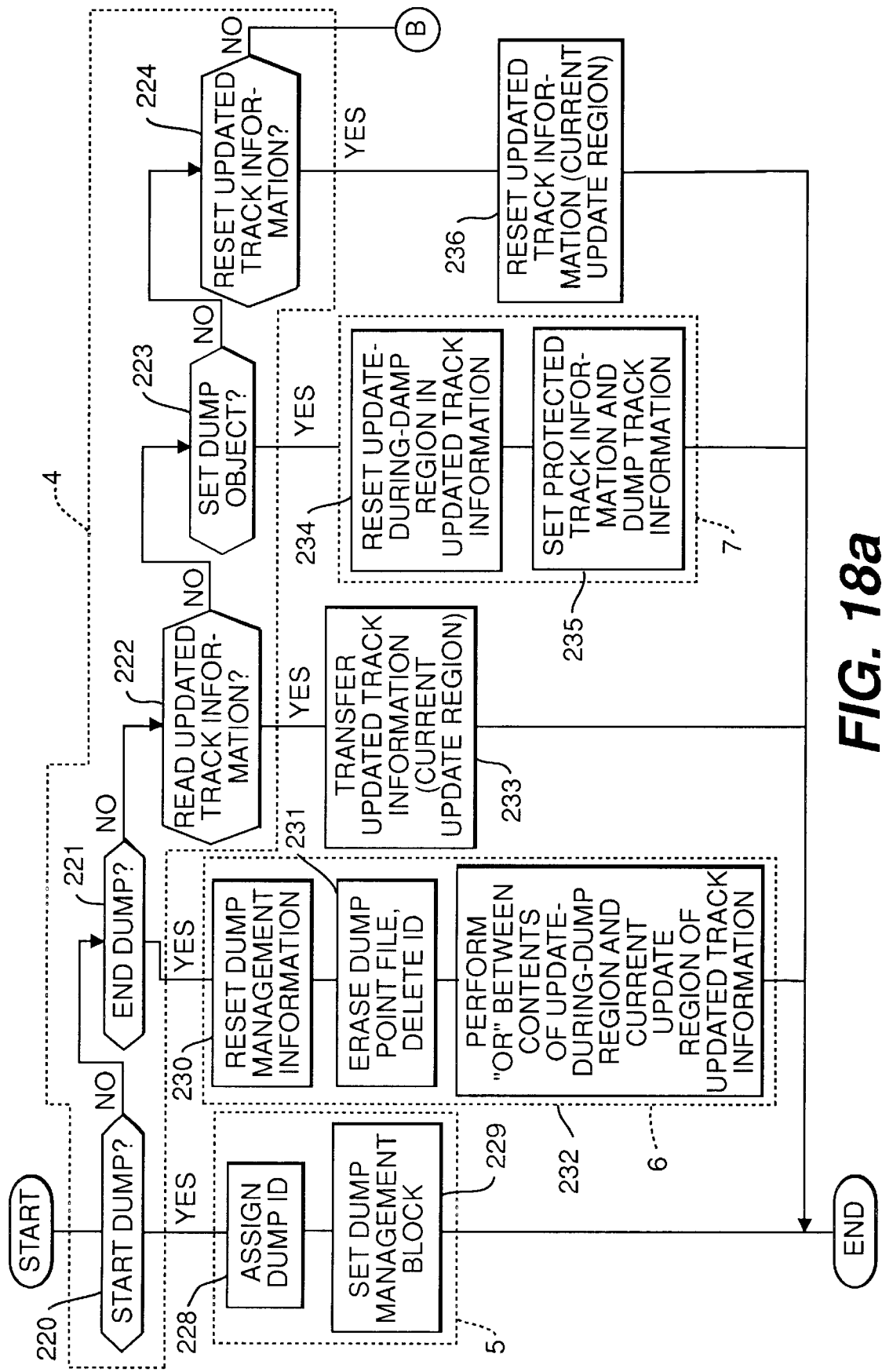
FIGS. 18(a) and 18(b) taken together show a flowchart showing the dump processing in the information processing system of FIG. 15.
Figure 18B:
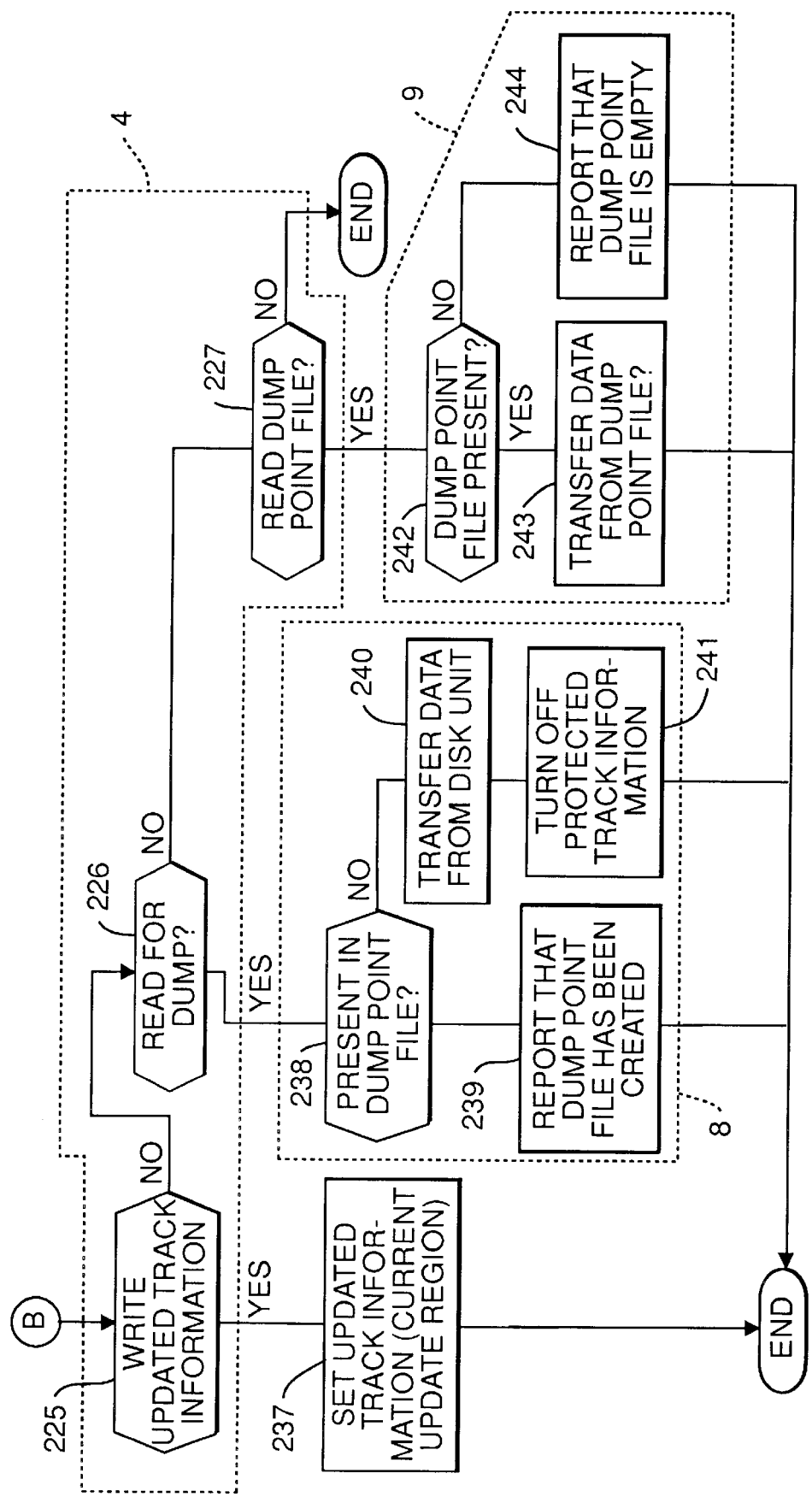

FIGS. 18(a) and 18(b) taken together are a flowchart showing the dump processing 2 to be performed by the director 22a of the disk controller 21a. Reference numerals enclosed with dotted lines in FIG. 18 correspond to the reference numerals of the functions of the director 22a of FIG. 16. FIGS. 18(a) and 18(b) are joined together, as shown, by the circled letter "B".

Steps 220 through 227 are steps executed in instruction determination processing 4 for interpreting the contents of an instruction issued by the CPU 20a. In step 220, the director 22a determines whether the instruction is a "start dump" instruction or not. If the instruction is "start dump", the director 22a goes to step 228; if the instruction is not "start dump", the director 22a goes to step 221. In step 221, the director 22a determines whether the instruction is an "end dump" instruction or not. If the instruction is "end dump," the director 22a goes to step 230; if the instruction is not "end dump," the director 22a goes to step 222. In step 222, the director 22a determines whether the instruction is a "read updated track information" instruction or not. If the instruction is "read updated track information", the director 22a goes to step 233; if the instruction is not "read updated track information", the director 22a goes to step 223. In step 223, the director 22a determines whether the instruction is a "set dump object" instruction or not. If the instruction is "set dump object", the director 22a goes to step 234; if the instruction is not "set dump object", the director 22a goes to step 224. In step 224, the director 22a determines whether the instruction is a "reset updated track information" instruction or not. If the instruction is "reset updated track information", the director 22a goes to step 236; if the instruction is not "reset updated track information", the director 22a goes to step 225. In step 225, the director 22a determines whether the instruction is a "write updated track information" instruction or not. If the instruction is "write updated track information", the director 22a goes to step 237; if the instruction is not "write updated track information", the director 22a goes to step 226. In step 226, the director 22a determines whether the instruction is a "read for dump" instruction or not. If the instruction is "read for dump", the director 22a goes to step 238; if the instruction is not "read for dump", the director 22a goes to step 227. In step 227, the director 22a determines whether the instruction is a "read dump point file" instruction or not. If the instruction is "read dump point file", the director 22a goes to step 242; if the instruction is not "read dump point file", the director 22a ends the dump processing 2.

Steps 228 and 229 are steps executed in the dump start processing 5. In step 228, the director 22a registers, in an empty entry of the file management block 45 (equivalent to that of FIG. 7), a disk unit number specified to be dumped as a dump ID. Then the director 22a initialize a head pointer 66 and a tail pointer 67. In step 229, the director 22a registers that disk unit number as a dump ID 71 of the dump management block 46 (equivalent to that of FIG. 8) and ends the dump processing 2.

Steps 130, 150, 151, and 132 are process executed in dump portion set processing 14.

Steps 230 through 232 are steps executed in the dump end processing 6. In step 230, the director 22a looks over the dump management block 46, and traces a protect information pointer 72 of an entry of a dump ID 71 matching the disk number. Then, the director 22a turns to OFF <0> the bits in the protected track information area 47 pointed to by the protect information pointer 72 to reset the dump management block 46. In step 231, the director 22a deletes the contents of the tracks stored in the dump point file 29 and makes the dump ID invalid. The way in which the dump point file 29 is deleted is the same as that in step 128 of the first embodiment. In step 232, the director 22a sets a result of a logical OR operation between a current update region 32 and an update-during-dump region 33 as bits for the current update region 32 of the updated track information 31 (equivalent to that of FIG. 2). This step allows the director 22a to dump a region updated between the starting of the last dumping and the starting of the current dumping, and a region updated during the last dumping. Then, the director 22a ends the dump processing 2.

In step 233, in response to the "read updated track information" instruction, the director 22a transfers information of the current update region 32 of the updated track information 31 to the CPU 20a and ends the dump processing 2.

Steps 234 and 235 are steps executed in the dump object set processing 7. In step 234, for the update-during-dump region 33 of the updated track information 31 corresponding to the disk unit having contents to be dumped, the director 22a turns to OFF <0> a bit corresponding to a track to be dumped that is designated by the CPU 20a to reset the track. This step allows the director 22a to identify the track updated during dumping. In step 235, the director 22a turns to ON <1> the bits corresponding to the specified track to be dumped in the protected track information area 47 and the dump track information area 48 (equivalent to that of FIG. 8). Then, the director 22a ends the dump processing 2.

In step 236, the director 22a turns to OFF <0> a bit corresponding to the specified track to be dumped in the current update region 32 of the updated track information to reset the current update region 32. Then, the director 22a ends the dump processing 2.

In step 237, in response to the "write updated track information" instruction, the director 22a turns to ON <1> the bit corresponding to the track to be dumped in the current update region 32 of the updated track information 31. Thereafter, the director 22a ends the dump processing 2.

Steps 238 through 241 are steps executed in the dump read processing 8. In step 238, the director 22a determines whether or not the contents of a track which is designated by CPU 20 as an object of the dump read are stored in the dump point file 29. If the contents of the track to be read for dump are stored in the dump point file 29, the director 22a goes to step 239; if not, the director 22a goes to step 240. To be more specific, the director 22a looks over the protected track information area 47 and checks for bits corresponding to the track to be read for the dump operation. If the bit is OFF <0>, then the director 22a decides that the track has been updated during dumping and that the dump point file 29 has been created. In step 239, the director 22a sends a report that "the dump point file has been created" to the CPU 20a and ends the dump processing 2. If the contents of the track to be read for dumping are not stored in the dump point file 29, the director 22a transfers the contents of the track from the disk unit 26 to the CPU 20a in step 240. In step 241, the director 22a turns to OFF <0> the bit, which corresponds to the track to be read for the dump whose contents have been transferred, in the protected track information area 47. Then, the director 22a ends the dump processing 2.

Steps 242 through 244 are steps executed in the dump point file read processing 9. In step 242, the director 22a determines whether the dump point file 29 is empty or not. If the dump point file 29 is empty, the director 22a goes to step 244; if not, the director 22a goes to step 243. To be more specific, the director 22a looks over the file management block 45 to find a dump ID 65 matching the dump ID designated by the CPU 20a, and checks a head pointer 66 corresponding to the dump ID 65. If the head pointer 66 of its entry is <null>, the director 22a determines that the dump point file 29 is empty. If the director 22 has determined that the dump point file 29 is not empty, the director 22a transfers the contents of the track from the dump point file 29 to the CPU 20a in step 243. The contents of the track to be transferred are stored in the cache slot corresponding to the SCB 40 pointed to by the head pointer 66 corresponding to the dump ID 65 coincident with the designated dump ID. The director 22a deletes this SCB 40 upon completion of the transfer and ends the dump processing 2. In step 244, the director 22a sends the report "the dump point file is empty" to the CPU 20a to inform it that the dump point file 29 is empty and ends the dump processing 2.

Figure 19:
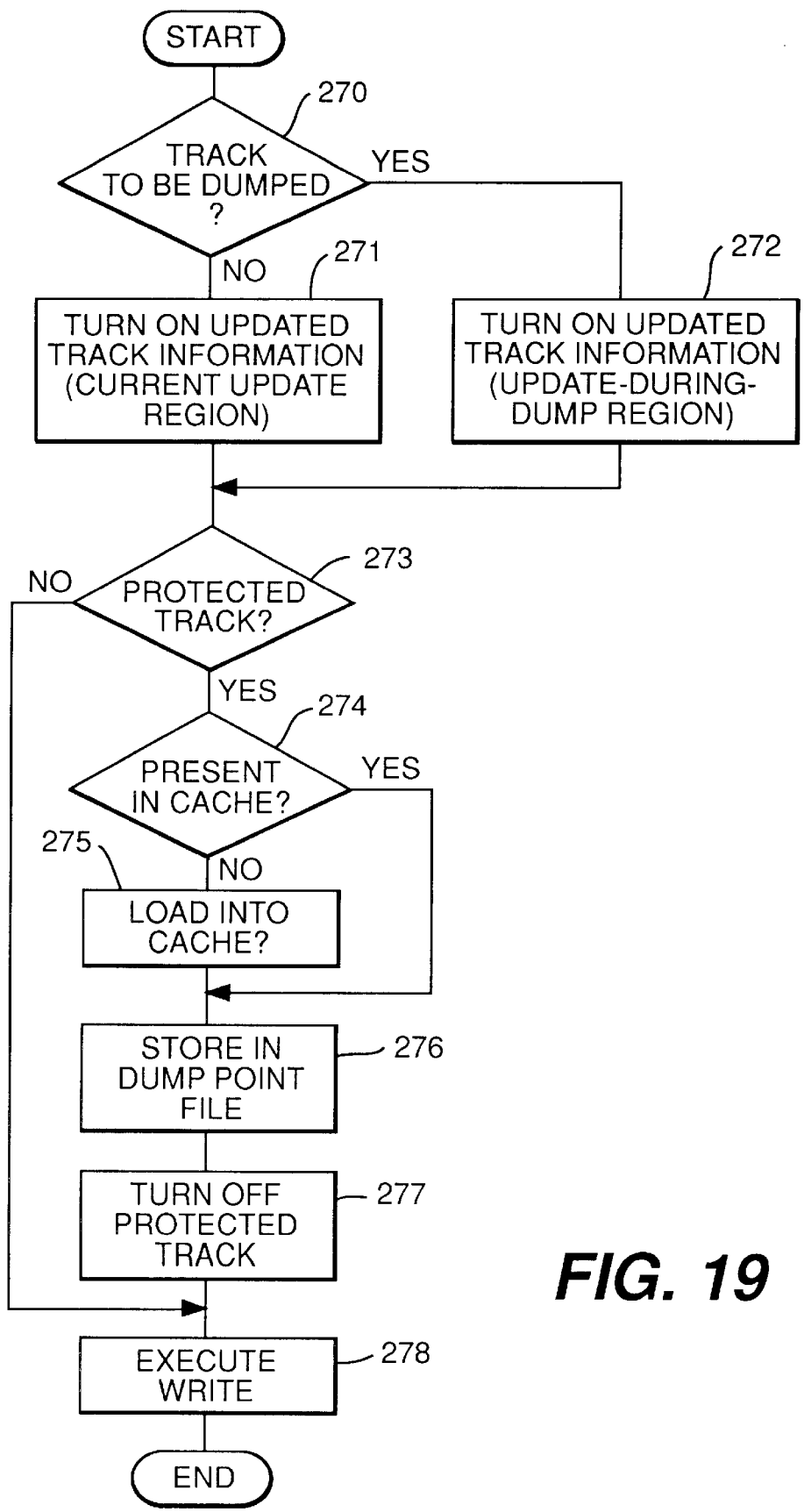
FIG. 19 is a flowchart showing the write processing in the information processing system of FIG. 15.

FIG. 19 is a flowchart showing the write processing 3 performed by the director 22a of the disk controller 21a in response to a write request issued by the CPU 20a. In step 270, the director 22a determines whether or not a track to be written is a track to be dumped. If the track to be written is a track to be dumped, the director 22a goes to step 272, otherwise, the director 22a goes to step 271. To be more specific, the director 22a looks over the dump track information area 48, and checks bits corresponding to the track to be written. If a bit is OFF <0>, the director 22a determines that the track to be written is not the track to be dumped. In step 271, the director 22a turns to ON <1> a bit for the current update region 32 of the updated track information 31 corresponding to the track to be written and then goes to step 273. In step 272, the director 22a turns to ON <1> a bit for update-during-dump region 33 of the updated track information corresponding to the track to be written. Steps 273 through 278 are corresponding to respective steps 161 through 166 of the first embodiment and the same as them.

According to the above-mentioned second embodiment of the invention, the CPU reads the updated track information, determines the track to be dumped, and indicates the determined track to the disk controller, thereby making it unnecessary for the disk controller to determine whether a track to be read for dump is a track to be dumped.

Figure 20:
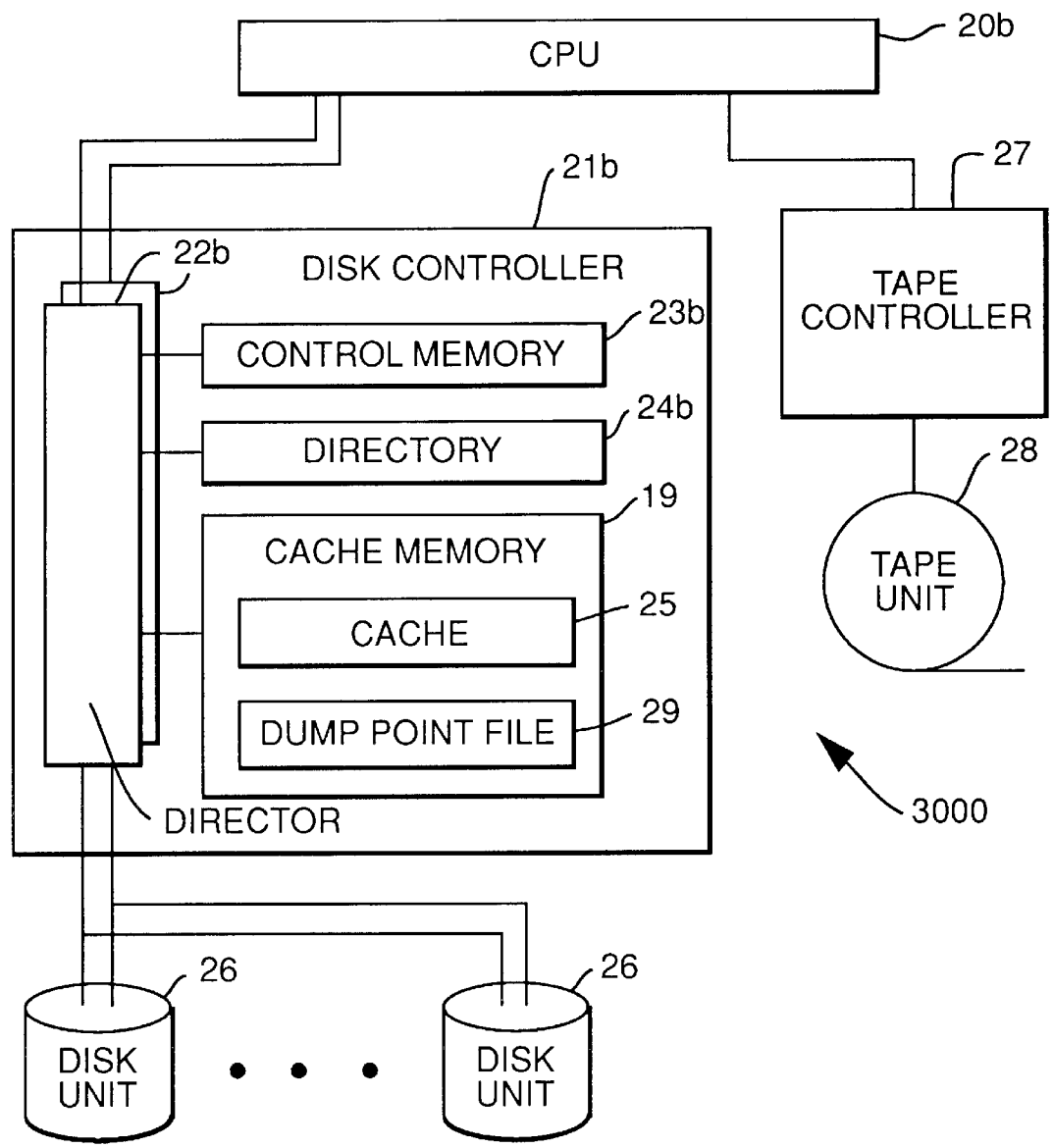
FIG. 20 is a schematic diagram illustrating the overall arrangement of the information processing system according to a third embodiment of the invention.

FIG. 20 shows an overall arrangement of an information processing system 3000 according to a third embodiment of the invention. The information processing system 3000 differs from the information processing system of the second embodiment. The central processing unit (CPU) 20b, the director 22b and the constitution of a directory 24b of a disk controller 21b function differently. Specifically, the information processing system 3000 differs from the information processing system 2000 in that, with the second embodiment, the update-during-dump region 33 of the updated track information 31 is reset when the disk controller 21a receives the track to be dumped, while, with the third embodiment, the CPU 20b issues an "initialize update information" instruction to the disk controller 21b to initialize the update-during-dump region 33 before a read for dump operation is performed.

Figure 21:
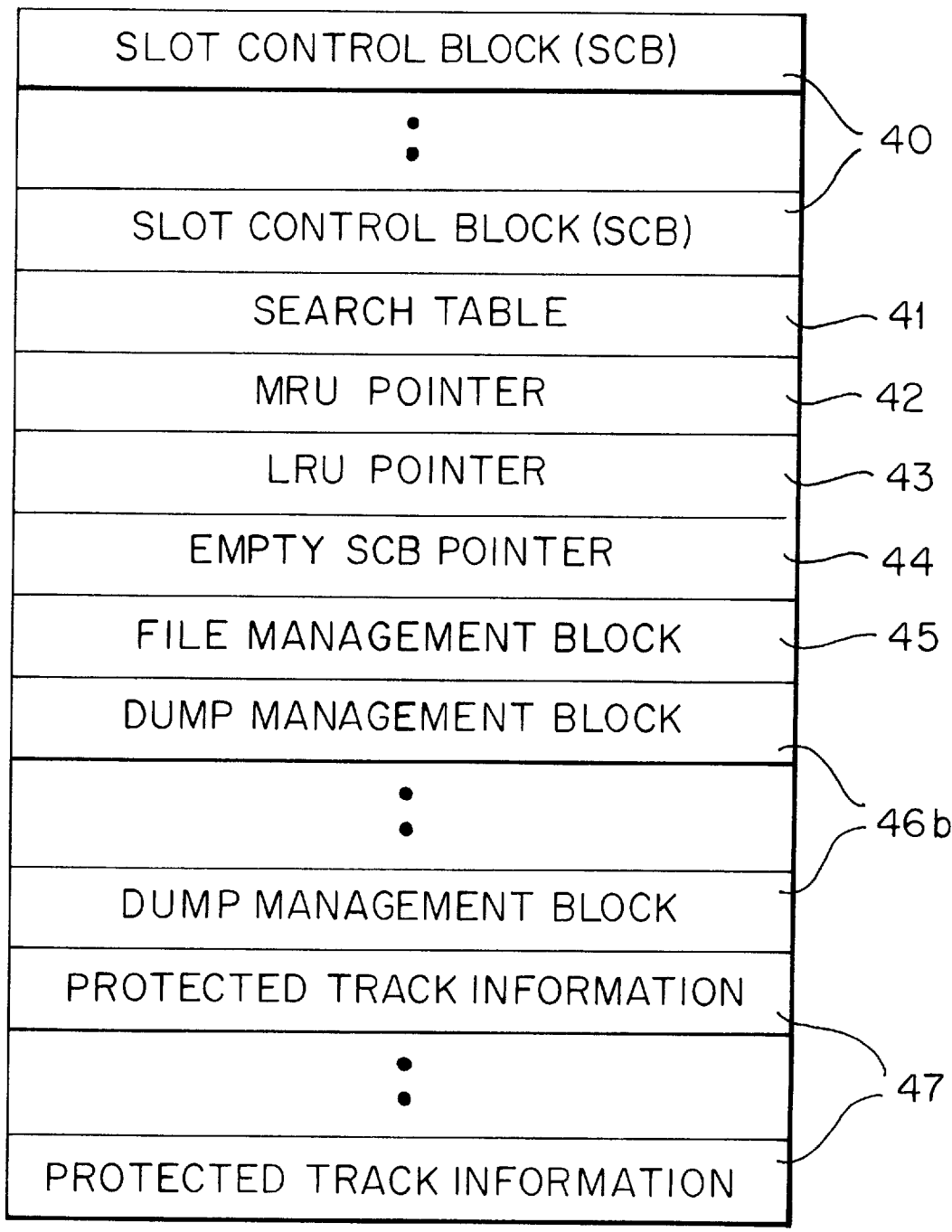
FIG. 21 is a diagram illustrating the contents of the directory.

FIG. 21 shows a constitution of the directory 24b of the disk controller 21b. The directory 24b is composed of a slot control block (SCB) 40 (equivalent to that of FIG. 5), a search table 41 (equivalent to that of FIG. 6), an MRU pointer 42, an LRU pointer 43, an empty SCB pointer 44, a file management block 45 (equivalent to that of FIG. 7), a dump management block 46b, and a protected track information 47. The directory 24b has no dump track information like that of the first or second embodiment (Refer to FIG. 3).

Figure 22:
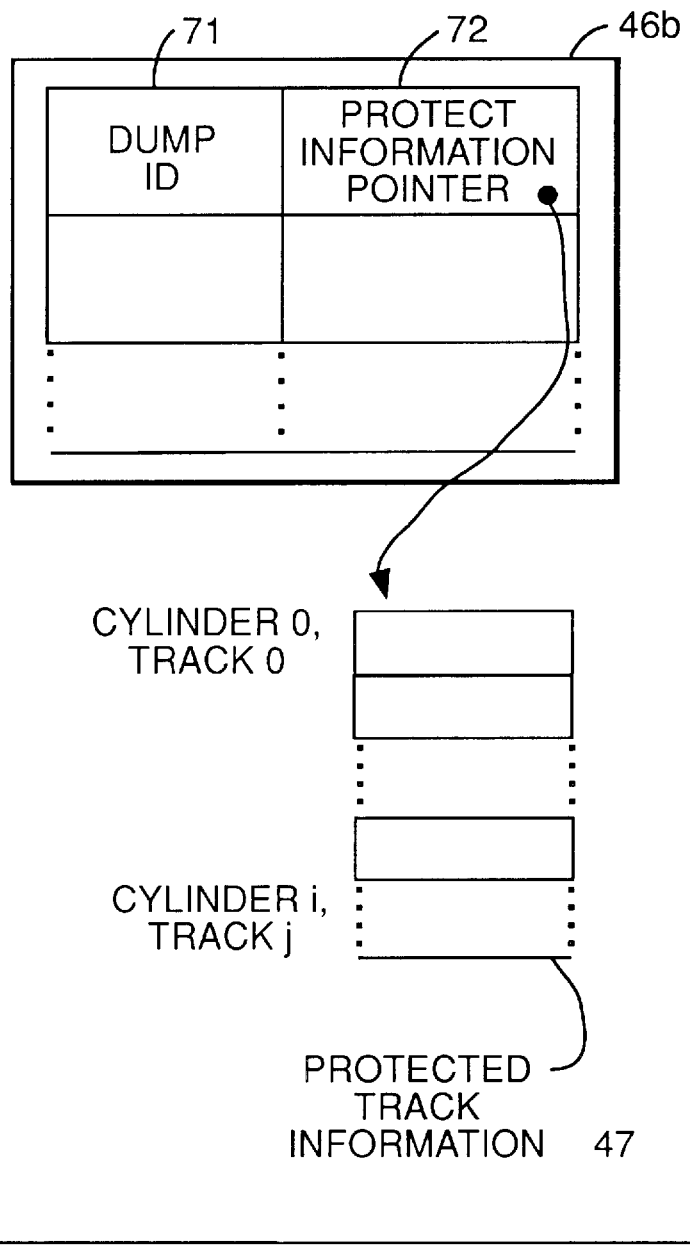
FIG. 22 is a diagram illustrating a relation between the dump management block and a storage device.

FIG. 22 shows the relation between the dump management block 46b and the protected track information area 47 in directory 24b. The dump management block 46b stores, for each dump ID 71, a protect information pointer 72 that points to the protected track information area 47. The protected track information area 47 is a bit map for indicating a protected track. When a bit is ON <1>, a corresponding track is protected; when the bit is OFF <0>, the corresponding track is not protected.

Figure 23:
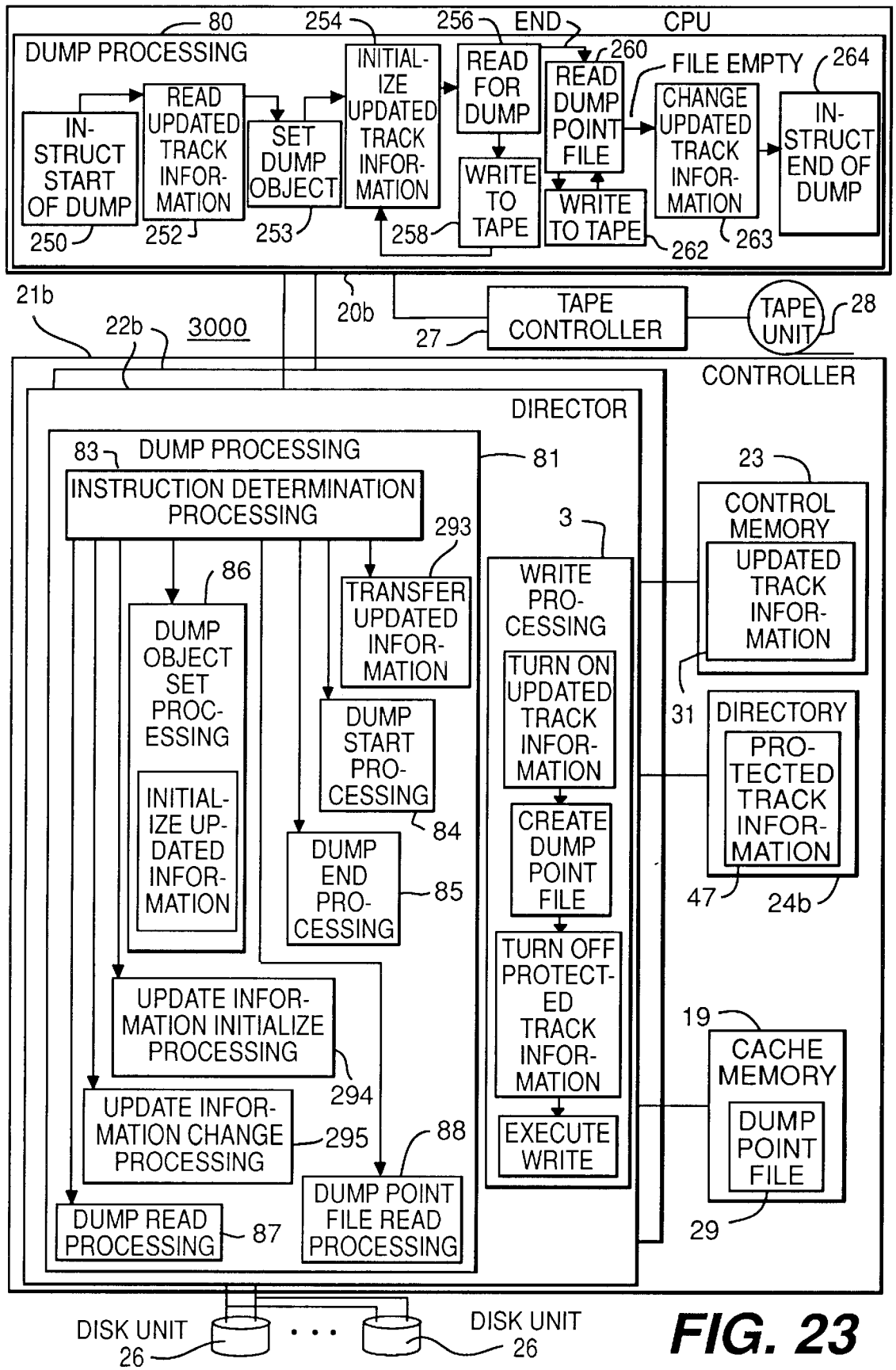
FIG. 23 is a schematic diagram illustrating operations of the information processing system of FIG. 20.

FIG. 23 shows a schematic diagram of operations performed by the information processing system 3000. The CPU 20b executes dump processing 80. Each directory 22b of the disk controller 21b executes the dump processing 81 and write processing 3. It should be noted that the write processing 3 is the same as that of the write processing of the second embodiment.

Figure 24:
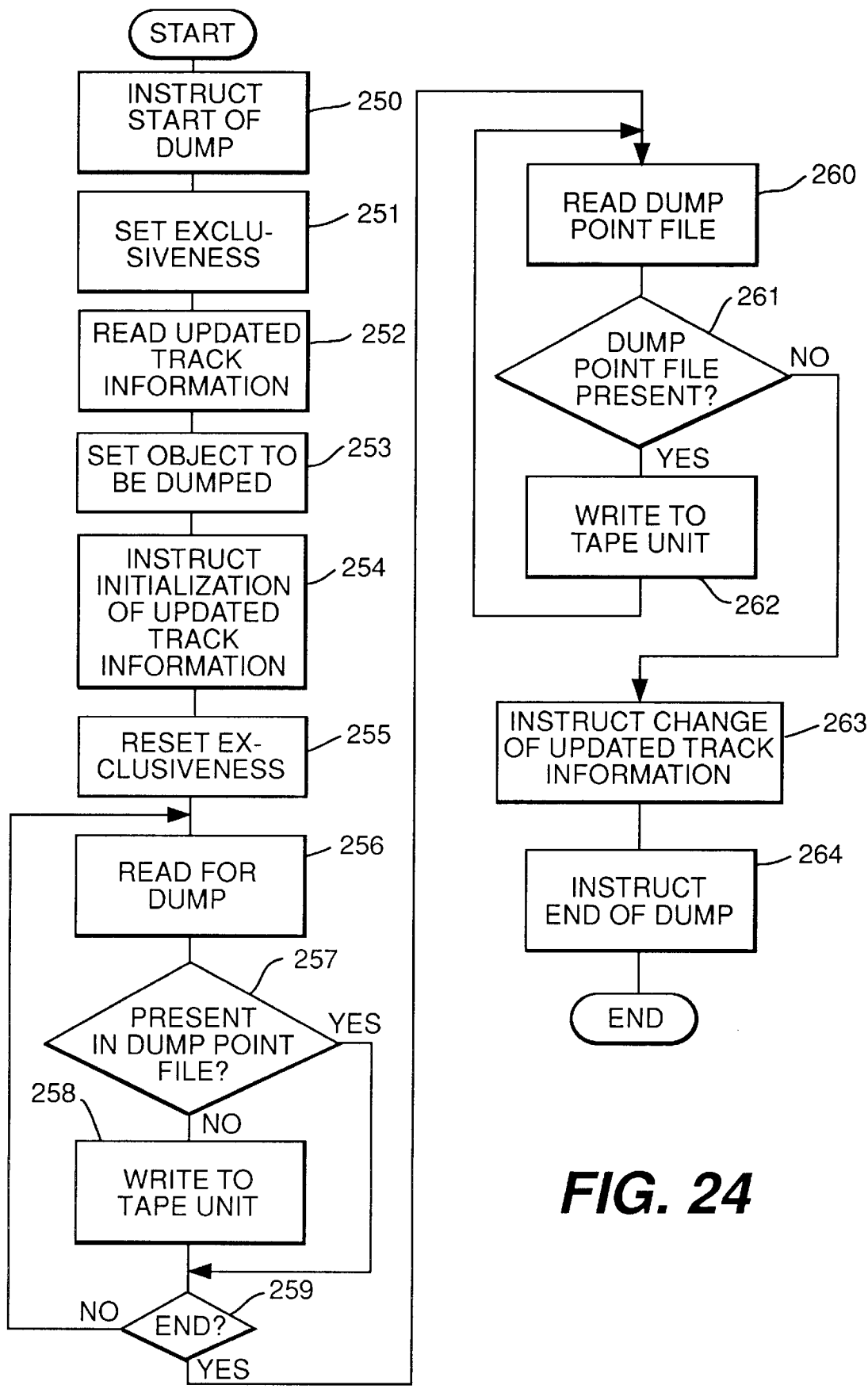
FIG. 24 is a flowchart showing the dump portion processing in the information processing system of FIG. 20.

FIG. 24 is a flowchart showing the dump processing 80 to be executed by the CPU 20b. Reference numerals of functions of the CPU 20b of FIG. 23 correspond to step numbers of FIG. 24.

In step 250, the CPU 20b issues a "start dump" instruction to the disk controller 21b. In step 251, the CPU 20b puts a region of a dump portion in a disk unit 26 into an exclusive state. In step 252, the CPU 20b issues a "read updated track information" instruction to the disk controller 21b to read updated track information 31 (equivalent to that of FIG. 2), thereby identifying a track to be dumped. In step 253, based on the updated track information 31 read in step 252, the CPU 20b issues a "set track to be dumped" instruction to the disk controller 21b. To be more specific, the CPU 20b designates a track whose bit for a current update region 32 is ON <1> as the track to be dumped. In step 254, the CPU 20b issues an "initialize updated track information" instruction to the disk controller 21b to initialize the updated track information 31 for the track to be dumped. In step 255, the CPU 20b clears the exclusive state set in step 251. In step 256, the CPU 20b issues a "read for dump" instruction to the disk controller 21b. In step 257, the CPU 20b receives a report indicating whether "a dump point file 29 storing contents of the track to be dumped exists or not" from the disk controller 21b. If such a dump point file 29 does not exist, the CPU 20b receives, from the disk controller 21b, the contents of the track to be dumped and goes to step 258. If the dump point file exists, the CPU 20b goes to step 259. In step 258, the CPU 20b writes the above-mentioned contents to a tape unit 28. In step 259, the CPU 20b determines whether the above-mentioned steps 256 through 258 have been performed on all tracks to be dumped or not. If any track remains unprocessed, the CPU 20b goes back to step 256, otherwise the CPU 20b goes to step 260. In step 260, the CPU 20b issues a "read dump point file" instruction to the disk controller 21b to read the "contents of track" from the dump point file 29. In step 261, upon receiving the "contents of track" of the dump point file 29 from the disk controller 21b, the CPU 20b goes to step 262. If the CPU 20b receives a report indicating that the "dump point file is empty", the CPU 20b goes to step 263. In step 262, the CPU 20b writes the received "contents of track" to the tape unit 28 and goes back to step 260. If the CPU 20b receives a report indicating that the "dump point file is empty" from the disk controller 21b in step 260, the CPU 20b issues a "reset updated track information" instruction to the disk controller 21b to reset the updated track information 31 in step 263. In step 264, the CPU 20b issues "end dump" instruction to the disk controller 21b.

Figure 25A:
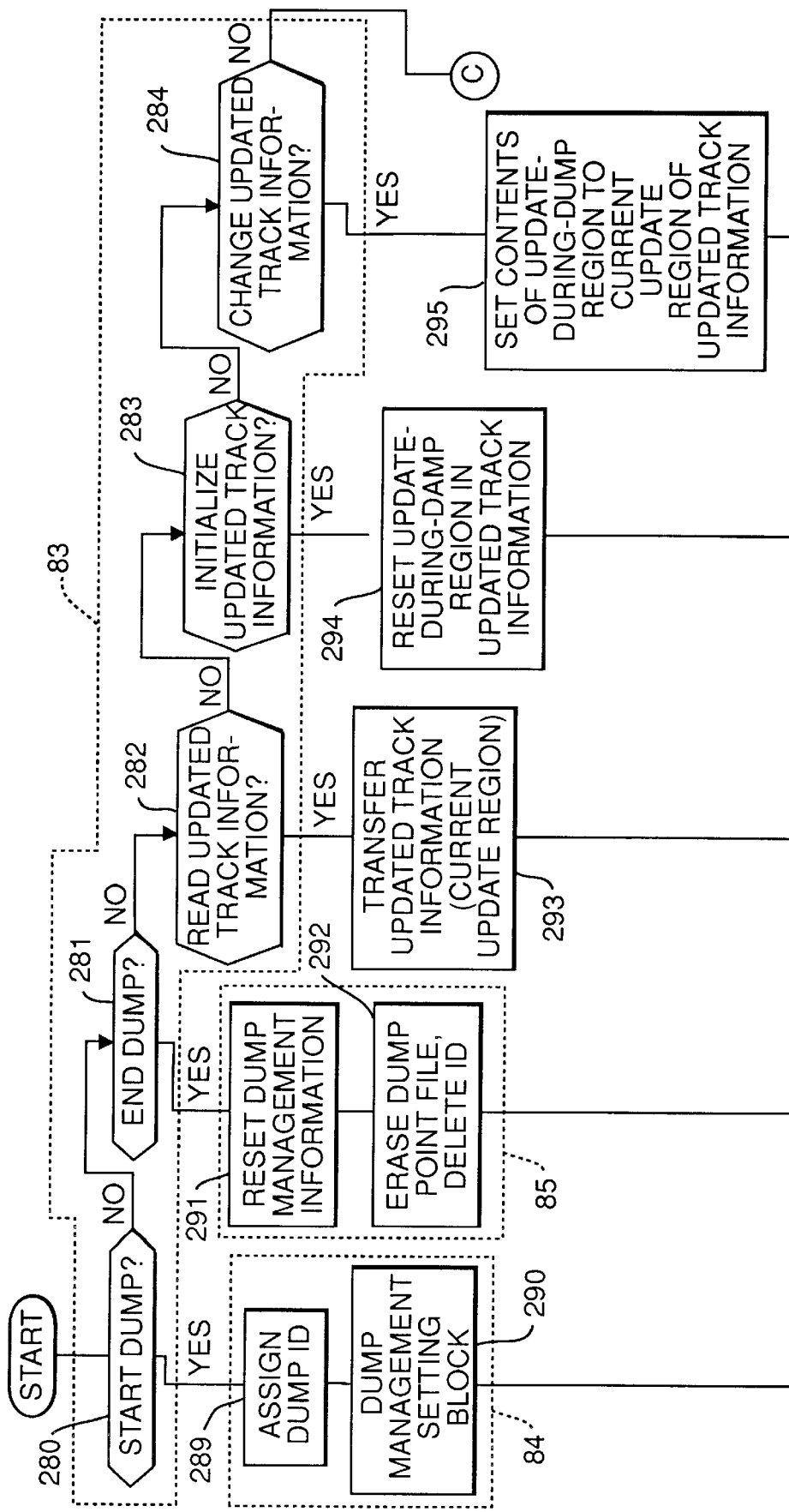
FIGS. 25(a) and 25(b) taken together show a flowchart showing the dump processing in the information processing system of FIG. 20.
Figure 25B:
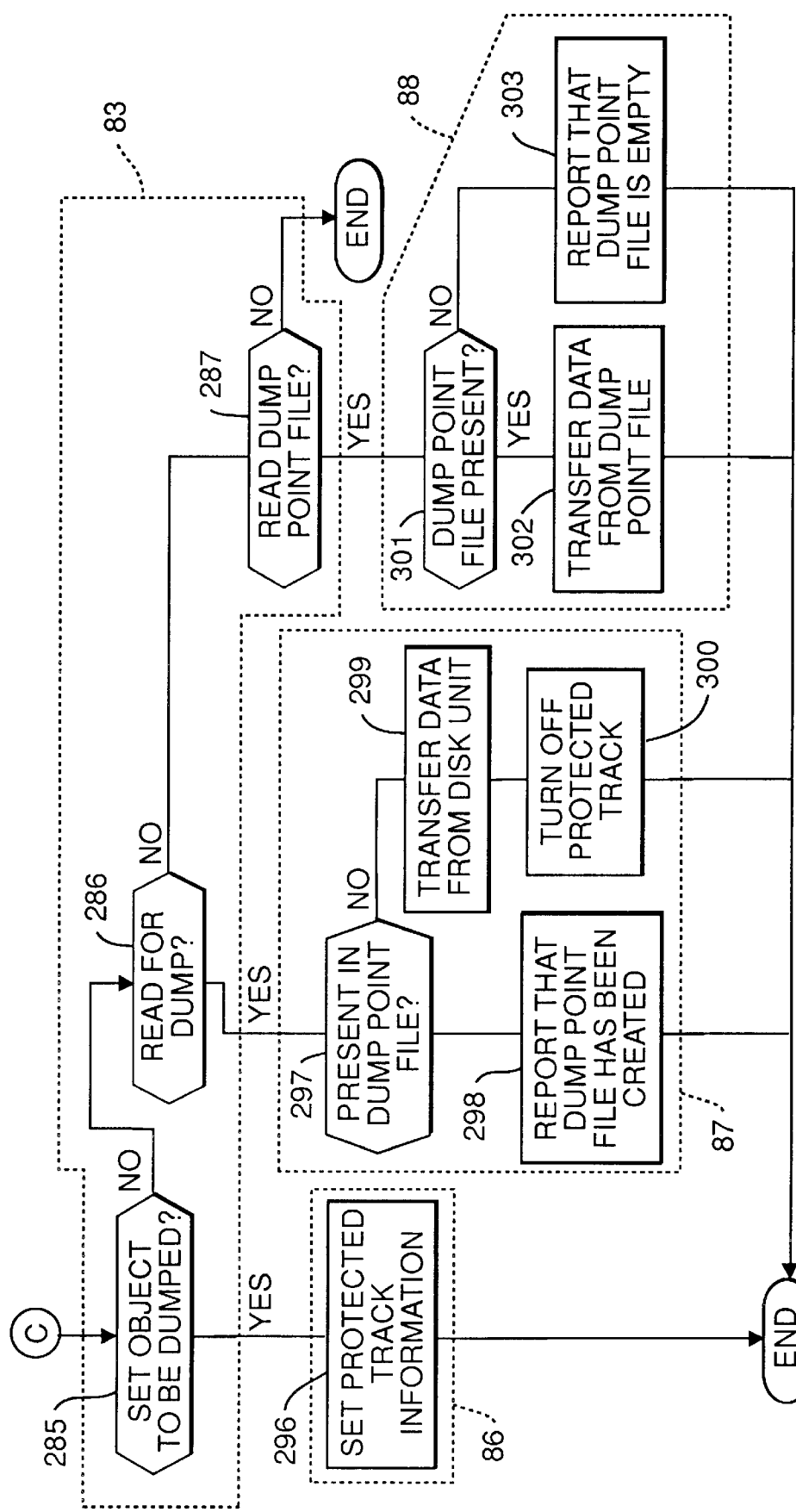

FIGS. 25(a) and 25(b) taken together show a flowchart showing the dump processing 81 to be performed by the director 22b of the disk controller 21b. In FIG. 25, reference numerals for steps enclosed with dotted lines correspond to reference numerals in the director 22b of FIG. 23. The flowcharts of FIGS. 25(a) and 25(b) are joined by the circled letter "C", as shown.

Steps 280 through 287 are steps executed in the instruction determination processing 83 for interpreting the contents of an instruction issued by the CPU 20b. In step 280, the director 22b determines whether the instruction is a "start dump" instruction or not. If the instruction issued by the CPU 20b is "start dump", the director 22b goes to step 289; if not, the director 22b goes to step 281. In step 281, the director 22b determines whether the instruction is an "end dump" instruction or not. If the instruction is "end dump", the director 22b goes to step 291; if not, the director 22b goes to step 282. In step 282, the director 22b determines whether the instruction is a "read updated track information" instruction or not. If the instruction is "read updated track information", the director 22b goes to step 293; if not, the director 22b goes to step 283. In step 283, the director 22b determines whether the instruction is an "Initialize updated track information" instruction or not. If the instruction is "initialize updated track information", the director 22b goes to step 294; if not the director 22b goes to step 284. In step 284, the director 22b determines whether the instruction is a "change updated track information" instruction or not. If the instruction is "change updated track information", the director 22b goes to step 295; if not the director 22b goes to step 285. In step 285, the director 22b determines whether the instruction is a "set dump object" instruction or not. If the instruction is "set dump object", the director 22b goes to step 296; if not, the director 22b goes to step 286. In step 286, the director 22b determines whether the instruction is a "read for dump" instruction or not. If the instruction is "read for dump", the director 22b goes to step 297; if not, the director 22b goes to step 287. In step 287, the director 22b determines whether the instruction is a "read dump point file" instruction or not. If the instruction is "read dump point file", the director 22b goes to step 301; if not, the director 22b ends the dump processing 81.

Steps 289 and 290 are steps executed in the dump start processing 84. In step 289, the director 22b registers, as a dump ID, a disk unit number specified to be dumped into an empty entry of the file management block 45 (equivalent to that of FIG. 7) and initializes a head pointer 66 and a tail pointer 67. In step 290, the director 22b registers the above-mentioned disk unit number as a dump ID 71 of the dump management block 46b and ends the dump processing 81.

Steps 291 and 292 are steps executed in dump end processing 85. In step 291, the director 22b looks over the dump management block 46b, and traces the protect information pointer 72 of the entry of the dump ID 71 matching the disk unit number. Then, the director 22b turns off <0> bits for protected track information 47 pointed by the protect information pointer 72 to reset the dump management block 46.

In step 292, the director 22b deletes the contents of the tracks stored in the dump point file 29 and make the dump ID invalid. The way in which the dump point file 29 is deleted is the same as that of the step 128 of the first embodiment. Then, the director 22b ends the dump processing 81.

In step 293, in response to the "read updated track information" instruction, the director 22b transfers information of the current update region 32 of the updated track information 31 to the CPU 20b and ends the dump processing 81.

In step 294, the director 22b turns OFF <0> bits for the update-during-dump region 33 included in the portion to be dumped of the updated track information 31 to reset the region 33. This step allows the director 22b to identify the track updated during dumping. Then, the director 22b ends the dump processing 81.

In step 295, the director 22b replaces the bit for the current update region 32 of the updated track information with the bit for the update-during-dump region 33. As a result of execution of this step, it is possible to identify the tracks updated during the dump processing, in addition to the tracks updated between end of the dump processing and start of the next dump processing, as tracks to be dumped with referring to the current update region 31 at the next dump processing. Then, the director 22b ends the dump processing 81.

Step 296 is a step executed as the dump object set processing. In step 296, the director 22b turns to ON <1> bits corresponding to tracks designated by the CPU 20b as tracks to be dumped in the protected track information 47 and then ends the dump processing 81.

Steps 297 through 300 are steps executed in dump read processing 87. In step 297, the director 22b determines whether or not the contents of a track which is designated by the CPU 20b as an object of the dump read are stored in the dump point file 29. If the contents of the track to be read for dump are stored in the dump point file 29, the director 22b goes to step 298; if not, the director 22b goes to step 299. The decision can be made in the same manner as in step 238 of the second embodiment. If the contents of the track to be read for dump are stored in the dump point file 29, in step 298, the director 22b sends a report indicating that the "dump point file has been created" to the CPU 20b and ends the dump processing 81. In step 299, the director 22b reads the contents of the track to be read for dumping from the disk unit 26 and sends it to the CPU 20b. In step 300, the director 22b turns to OFF <0> the bits, in the protected track information 47, corresponding to the tracks whose contents have been transferred in the preceding step and ends the dump processing 81.

Steps 301 through 303 are steps executed in dump point file read processing 88. In step 301, the director 22b determines whether the dump point file 29 is empty or not. If the dump point file 29 is empty, the director 22b goes to step 303; if not, the director 22b goes to step 302. In step 302, the director 22b transfers contents of a track from the dump point file 29 to the CPU 20b. The contents of the track to be transferred are stored in the cache slot corresponding to the SCB 40 pointed to by the head pointer 66 of the dump ID concerned. The director 22b deletes this SCB 40 after the transfer and ends the dump processing 81. If the dump point file 29 is empty as a result of the determination made in step 301, the director 22b sends a report indicating that the "dump point file is empty" to the CPU 20b indicating that the dump point file 29 is empty and ends the dump processing 81.

According to the above-mentioned third embodiment, the update-during-dump region 33 is initialized immediately before the dump read operation. This allows the director 22b to identify the track updated between the starting of the last dump operation and the starting of the current dump operation without having the dump track information in the directory 24b.

Figure 26:
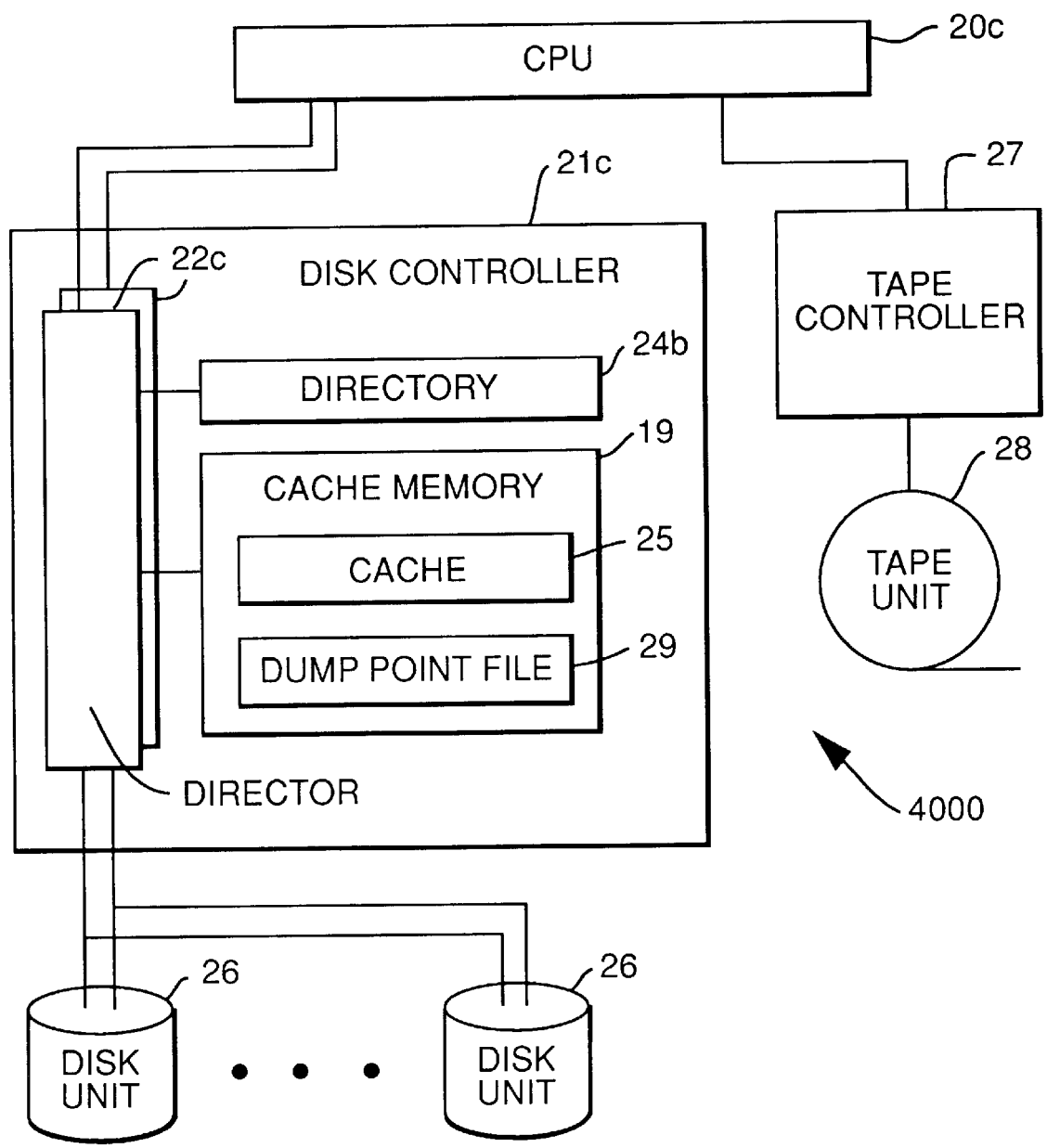
FIG. 26 is a schematic diagram illustrating the overall arrangement of the information processing system according to a fourth embodiment of the invention.

FIG. 26 shows an overall arrangement of an information processing system 4000 according to a fourth embodiment of the invention. The information processing system 4000 differs from the above-mentioned third embodiment. A central processing unit (CPU) 20c, and the directors 22c of a disk controller 21c function differently. Also, the disk controller 22c differs from that of the third embodiment; and the disk controller 22c does not have a control memory for storing the updated track information. In this embodiment, the CPU 20c manages the update region of the disk units 26 itself. Therefore, the CPU 20c can identify tracks to be dumped without receiving the information from the disk controller 21c.

Figure 27:
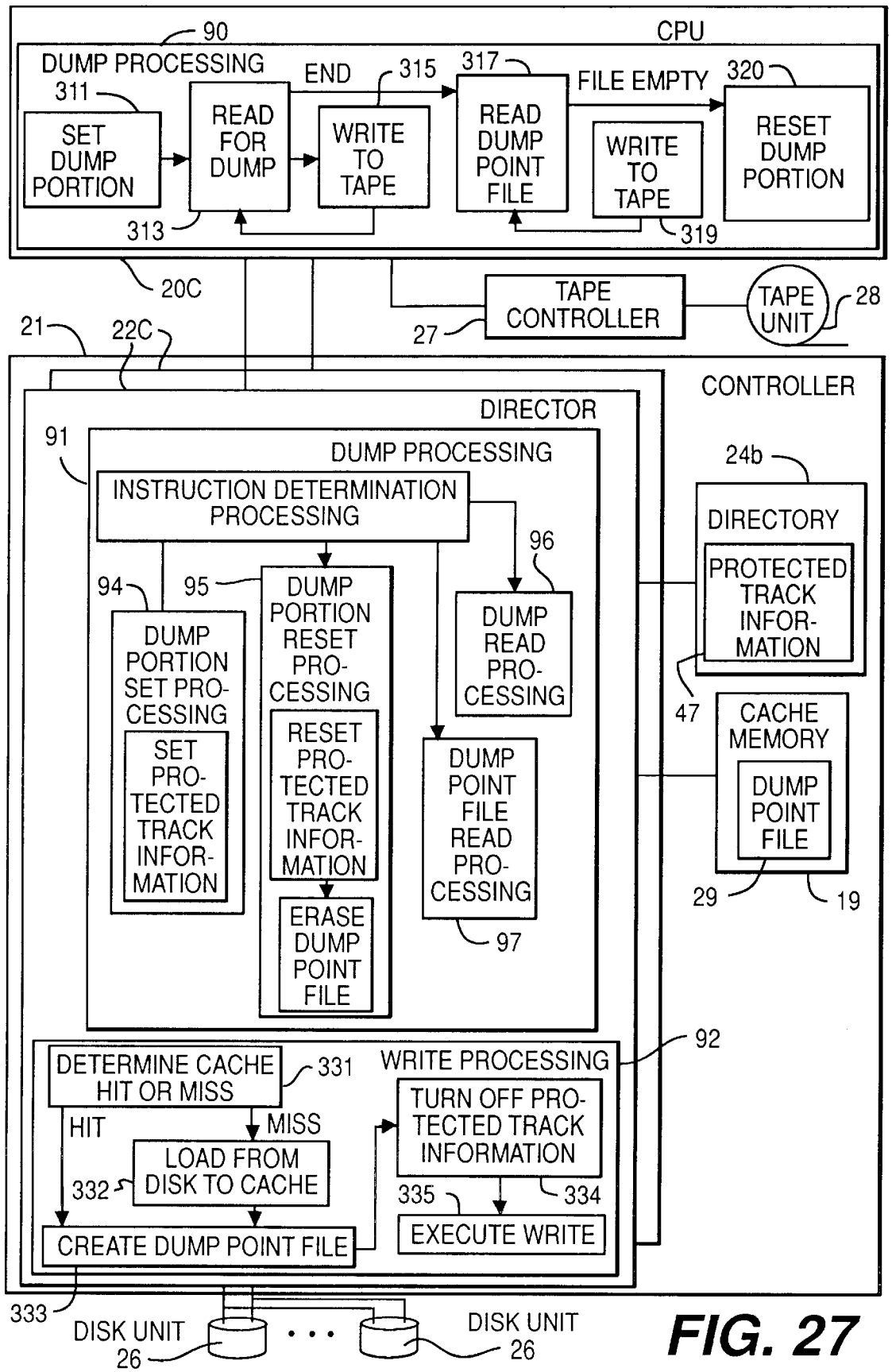
FIG. 27 is a schematic diagram illustrating operations of the information processing system of FIG. 26.

FIG. 27 shows a schematic diagram illustrating the operations of the information processing system 4000. The CPU 20c executes the dump processing 90. Each director 22c of the disk controller 21c executes the dump processing 91 and write processing 92.

Figure 28:
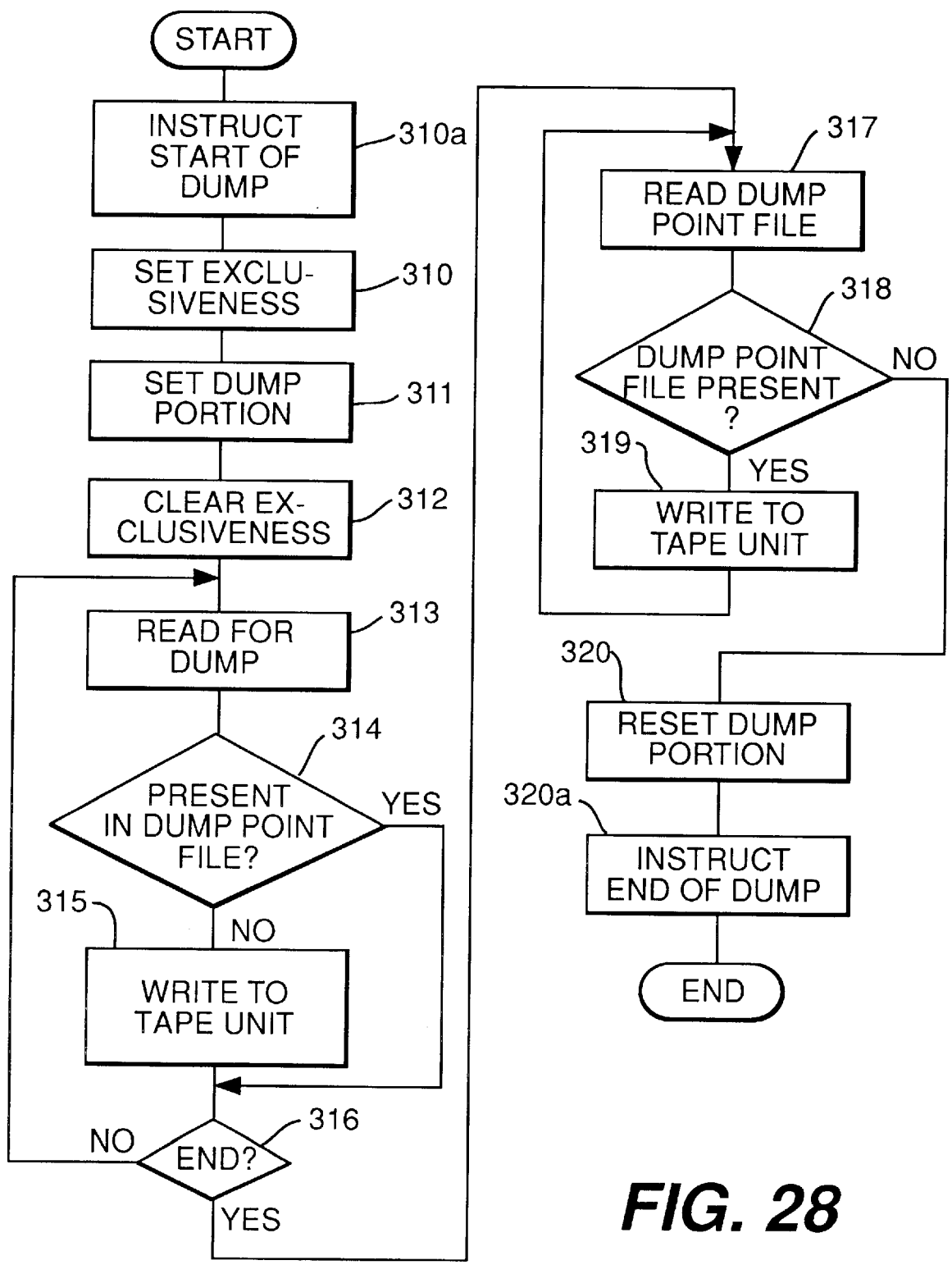
FIG. 28 is a flowchart showing the dump portion processing in the information processing system of FIG. 26.

FIG. 28 is a flowchart showing the dump processing 90 to be executed by the CPU 20c. Reference numerals of functions of the CPU 20c of FIG. 27 correspond to step numbers of FIG. 28. In step 310a, the CPU 20c issues "start dump" instruction to the disk controller 21c. In step 310, the CPU 20c puts a region of a dump portion in a disk unit 26 into an exclusive state. In step 311, the CPU 20c informs the disk controller 21c of "dump portion". In step 312, the CPU 20c clears the exclusive state set in step 101. The CPU 20c receives the contents of tracks to be dumped from the disk controller 21c in steps 313 through 319. Steps 313 through 319 are the same as the processing of steps 256 through 262 of the third embodiment. In step 320, the CPU 20c issues a "reset dump portion" instruction to the disk controller 21c to clear the setting of the dump portion. In step 320a, the CPU 20c issues an "end dump" instruction to the disk controller 21c and ends dump processing 90.

Figure 29A:
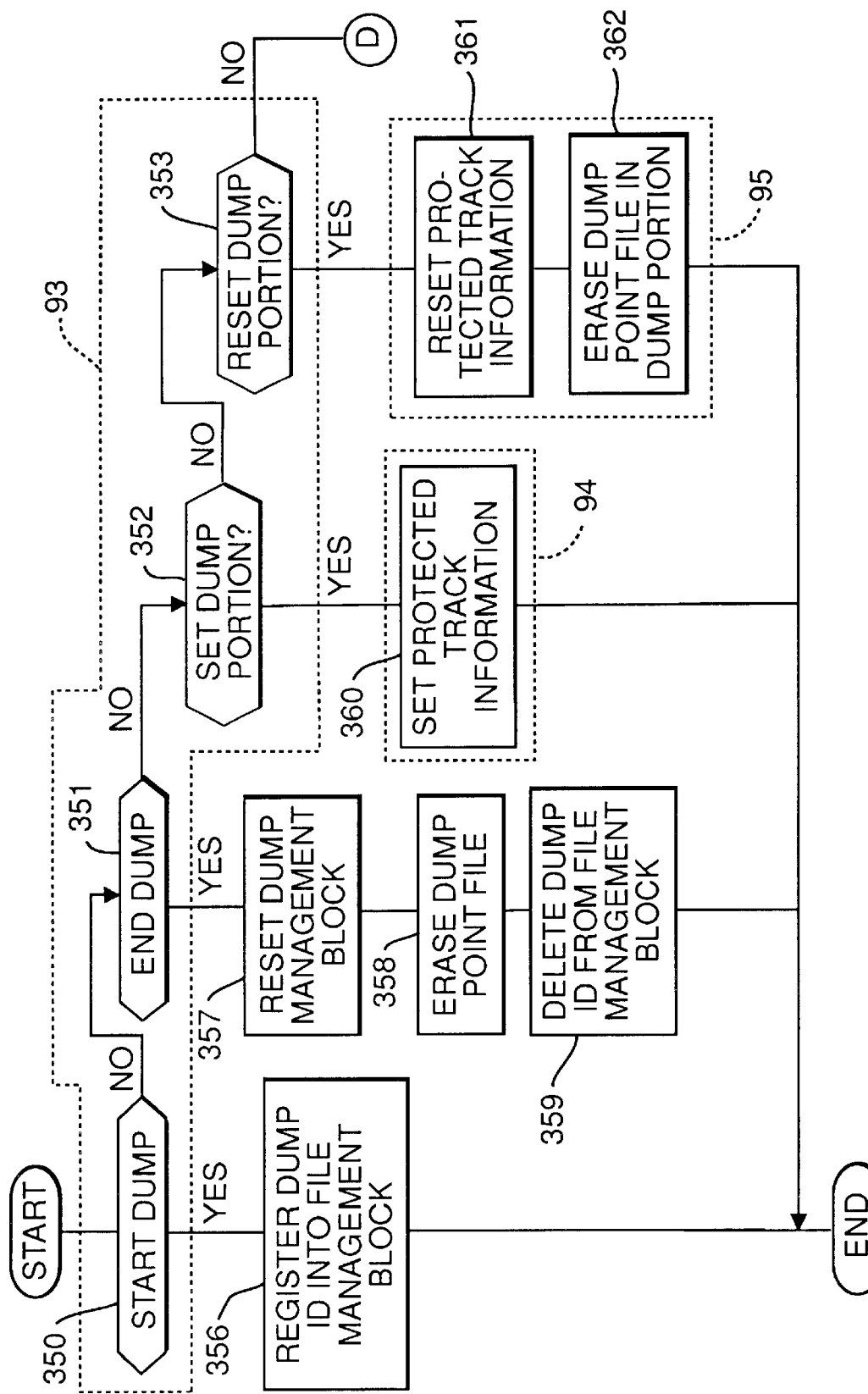
FIG. 29(a) and 29(b) are a flowchart showing the dump processing in the information processing system of FIG. 26.
Figure 29B:
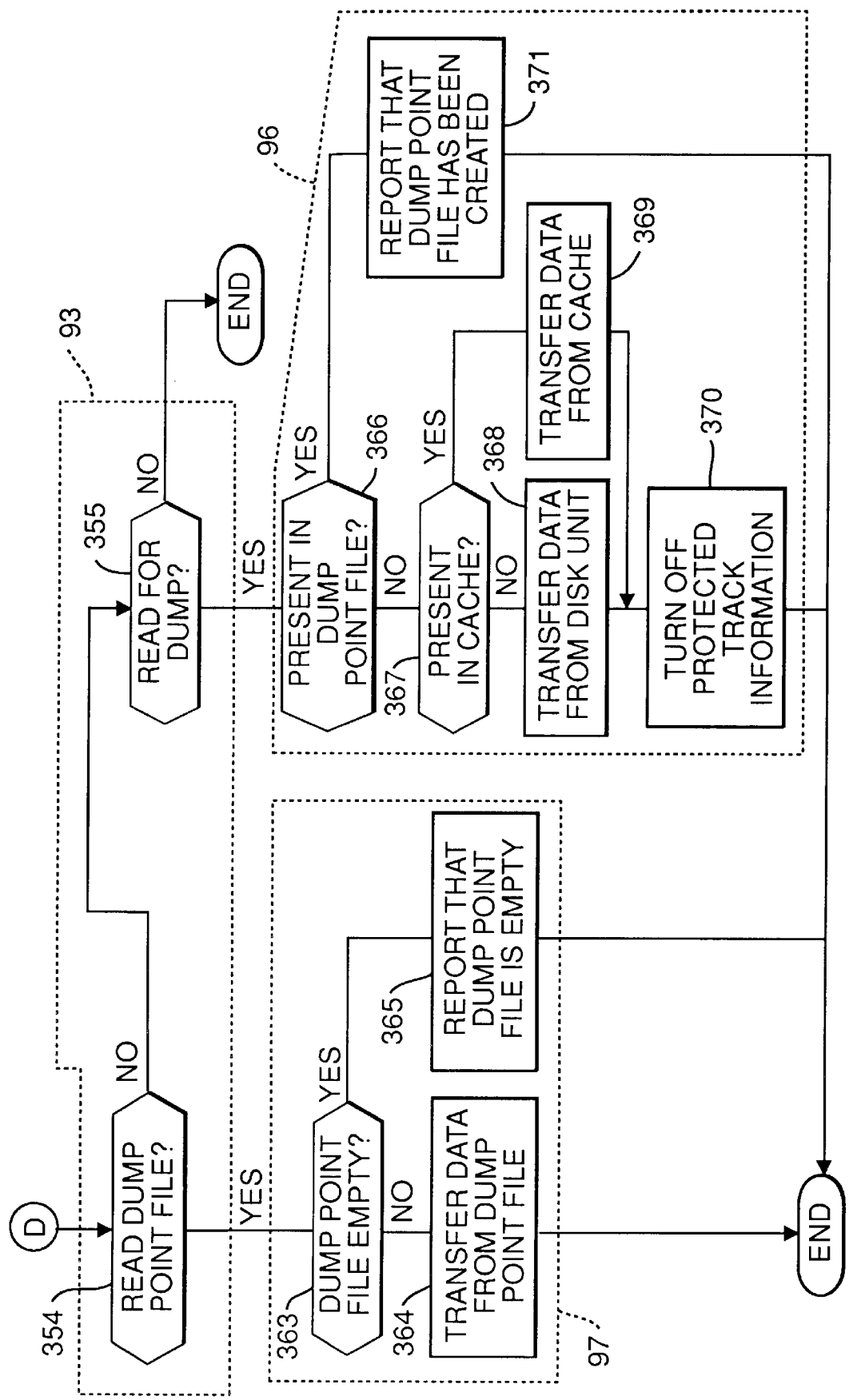

FIGS. 29(a) and 29(b), taken together, are a flowchart showing the dump processing 91 to be executed by the director 22c of the disk controller 21c. Reference numerals for steps enclosed with dotted lines in FIG. 29 correspond to the reference numerals in the director 22c of FIG. 27. FIGS. 29(a) and 29(b) are joined together, as shown, by the encircled letter "D".

Steps 350 through 355 are the steps executed in the instruction determination processing 93 for interpreting the contents of an instruction issued by the CPU 20c. In step 350, the director 22c determines whether the instruction is a "start dump" or not. If the instruction is "start dump", the director 22c goes to step 356; if not, the director 22c goes to step 351. In step 351, the director 20c determines whether the instruction is an "end dump" or not. If the instruction is "end dump", the director 22c goes to step 357; if not, the director 22c goes to step 352. In step 352, the director 22c determines whether the instruction is a "set dump portion" or not. If the instruction is "set dump portion", the director 22c goes to step 360; if not, the director 22c goes to step 353. In step 353, the director 22c determines whether the instruction is a "reset dump portion" or not. If the instruction is "reset dump portion", the director 22c goes to step 361; if not, the director 22c goes to step 354. In step 354, the director 22c determines whether the instruction is a "read dump point file" or not. If the instruction is "read dump point file", the director 22c goes to step 363; if not, the director 22c goes to step 355. In step 355, the director 22c determines whether the instruction is a "read for dump" or not. If the instruction is "read for dump", the director 22c goes to step 366; if not, the director 22c ends the dump processing 91.

In step 356, the director 22c registers a dump ID designated by the CPU 20c into an empty entry of a file management block 45 (equivalent to that of FIG. 7) in response to the "start dump" instruction and ends the dump processing 91. In step 357, the director 22b looks over the dump management block 46b (equivalent to that of FIG. 22) and traces the protect information pointer 72 of the entry of the dump ID 71 matching the dump ID designated by the CPU 20c. Then, the director 22b turns to OFF <0> the bits for the protected track information area 47 pointed to by the protect information pointer 72 to reset the dump management block 46. Thereafter, the director 22c sets the disk dump ID 17 to <null>. In step 358, the director 22c deletes the dump point file 29. The dump point file 29 is deleted in the same way as that of step 128 of the first embodiment. In step 359, the director 22c sets the dump ID 65 of the file management block 45 to <null>, to release the dump ID and ends the dump processing 91.

Step 360 is a step executed as dump portion set processing 94. In step 360, the director 22b turns to ON <1> bits corresponding to tracks designated by the CPU 20b as tracks to be dumped in the protected track information 47 to set the track in the dump portion as a protected track and ends the dump processing 91.

Steps 361 and 362 are steps executed in the dump portion reset processing 95. In step 361, the director 22c looks over the dump management block 46b (equivalent to that of FIG. 22) to find a dump ID,71 which is coincident with the dump ID designated by the "rest dump portion" instruction. If such a dump ID 715 is found, the director 22 traces the protect information pointer 72 corresponding to the dump ID 71, to fetch the protected track information 47. Then, the director 22 turns to OFF <0> the bit corresponding to the tracks that have been taken out of the dump portion. In step 362, the director 22c deletes the contents of the tracks taken out of the dump portion from the dump point file 29. The process executed in this step is the same as the that of step 134 of the first embodiment. Thereafter, the director 22c ends the dump processing 91.

Steps 363 through 365 are steps executed in dump point file read processing 97. In step 363, the director 22c determines whether the dump point file 29 is empty or not. If the dump point file 29 is not empty, the director 22c goes to step 364; if the dump point file 29 is empty, the director 22c goes to step 365. The determination can be made in the same way as that of step 242 in the second embodiment. In step 364, the director 22c transfers contents of a track, which are stored in a cache slot corresponding to an SCB 40 pointed to by the head pointer 66 corresponding to the dump ID designated by the CPU 20c, from the dump point file 29 to the CPU 20c. The director 22c deletes the SCB 40 concerned upon the transfer. To do so, the director 22c replaces the head pointer 66 of the file management block 45 with the backward pointer 52 of the SCB 40 to be removed, sets the disk unit number 53 of this SCB 40 to <null>, and chains this SCB 40 to the empty SCB chain pointed by the empty pointer 44. Then, the director ends the dump processing 91. On the other hand, if the dump point file 29 is empty, the director 22c sends a report indicating that the "dump point file is empty" to the CPU 20c to indicate that the dump point file 29 is empty in step 365. Then, the director 22c ends the dump processing 91.

Steps 366 through 371 are steps executed in the dump read processing 96. In step 366, the director 22c determines whether or not the contents of a track which is designated by CPU 20c as an object of the dump read are stored in the dump point file 29. If the track to be read for dumping is not stored in the dump point file 29, the director 22c goes to step 367; if the track is stored, the director 22c goes to step 371. The decision can be made like that made in the step 238 of the second embodiment. In step 367, the director 22c refers to the search table 41 (equivalent to that of FIG. 6) and checks the search pointer 64 corresponding to the track designated by the CPU 20c. If the search pointer 64 is <null>, the director 22c determines that the contents of the track to be read for dumping are not stored in cache 25 and goes to step 368. If the search pointer 64 of the search table 41 is not <null>, the director 22c determines that the contents of the track are stored in the cache 25 and goes to step 369. In step 368, the director 22c transfers the contents of the track to be read for dumping from the disk unit 26 to the CPU 20c and goes to step 370. In step 369, the director 22c transfers the contents of the track to be read for dump from the cache 25 to the CPU 20 and goes to step 370. In step 370, based on the protected track information 47, the director 22c turns to OFF <0> the bit, which corresponds to the track to be read for dumping, of the protected track information 47 and ends the dump processing 11. If the contents of the track to be read for dumping are stored in dump point file 29, the director 22c sends a report "dump point file has been created" to the CPU 20c in step 371 and ends the dump processing 91.

Figure 30:
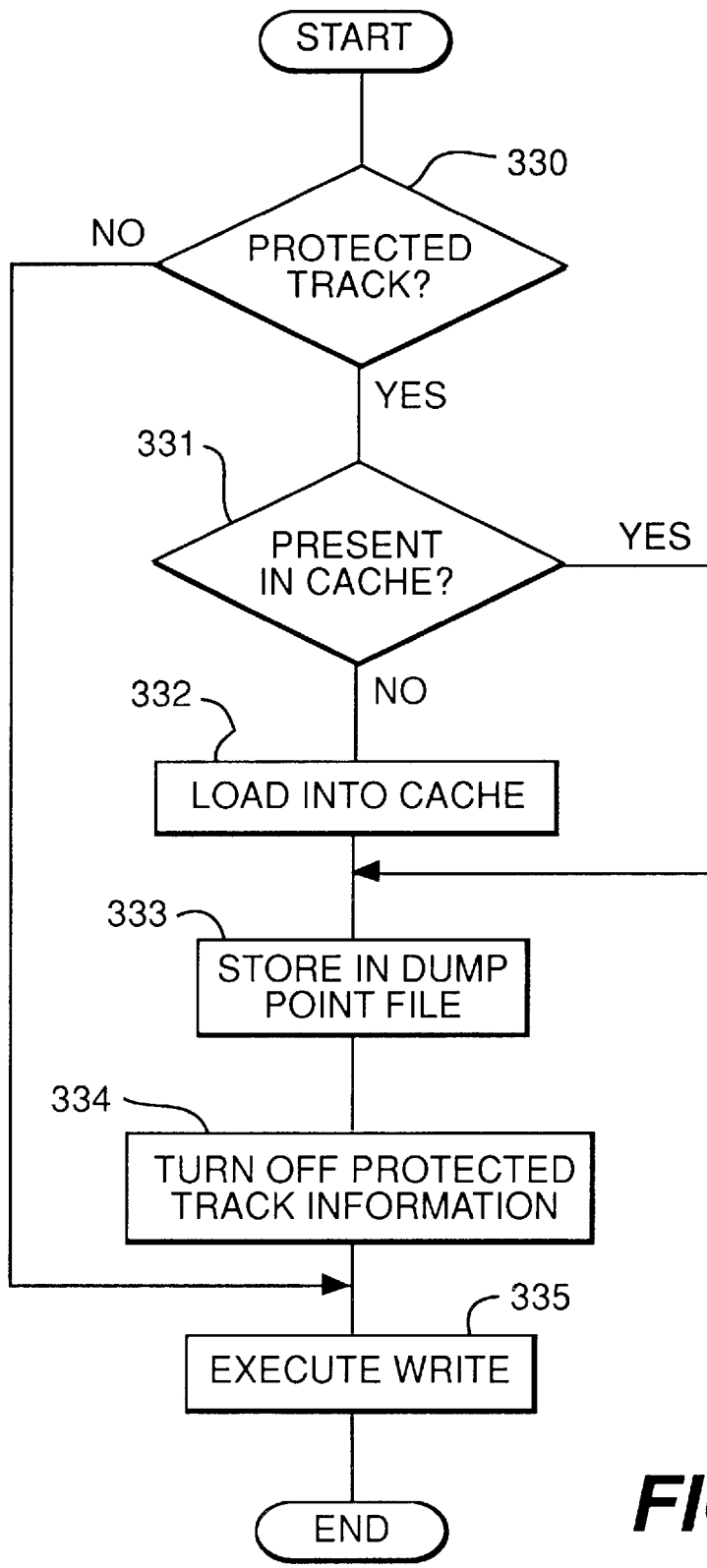
FIG. 30 is a flowchart showing the write processing in the information processing system of FIG. 26.

FIG. 30 is a flowchart showing write processing 92 to be executed by the director 22c of the disk controller 21c. The step numbers of FIG. 30 correspond to the reference numerals in the director 22c of FIG. 27. Processing of all steps 330 through 335 is performed in the same way as with the processing of steps 161 through 166 of the first embodiment.

Figure 31:
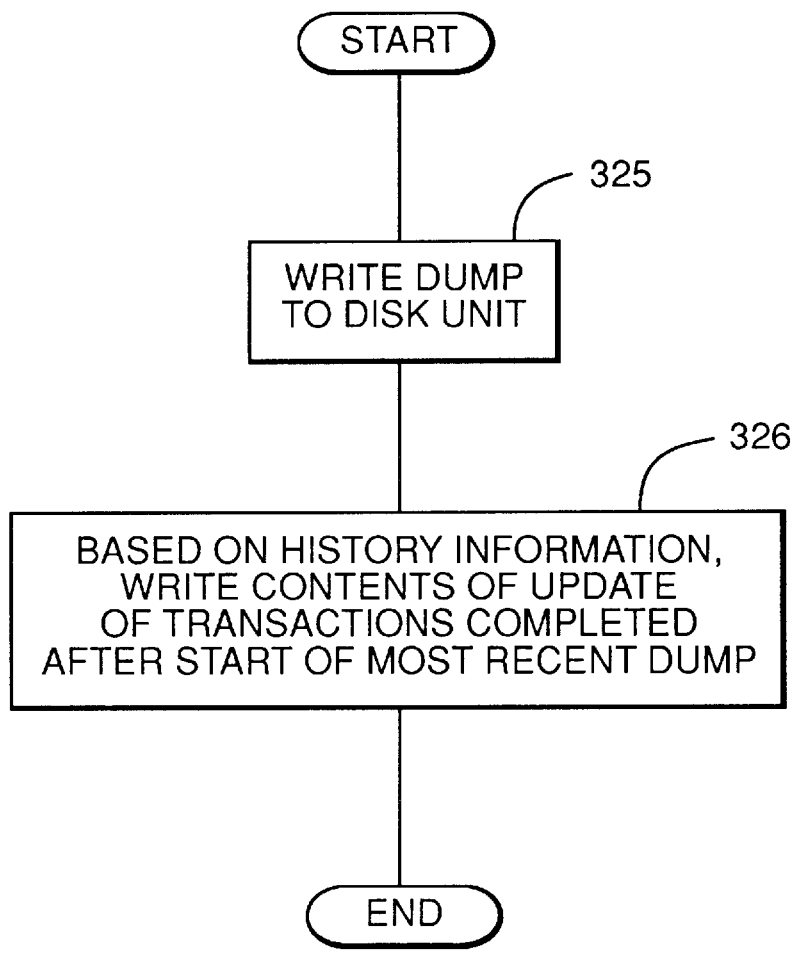
FIG. 31 is a flowchart showing the fault recovery processing in the information processing system of FIG. 26.

FIG. 31 is a flowchart showing a fault recovery processing to be executed by the CPU 20c. In step 325, the CPU 20c reads all dump contents from the tape unit 28 to write the contents to the disk unit 26 again. In step 326, based on the dump history information, the CPU 20c writes to the disk unit 26 updated contents of a transaction completed after starting of a most recent dump.

According to the above-mentioned fourth preferred embodiment of the invention, in addition to the effects provided by the third embodiment, the CPU itself manages the update region, thereby eliminating the necessity for having a control memory for managing the update region.

Figure 32:
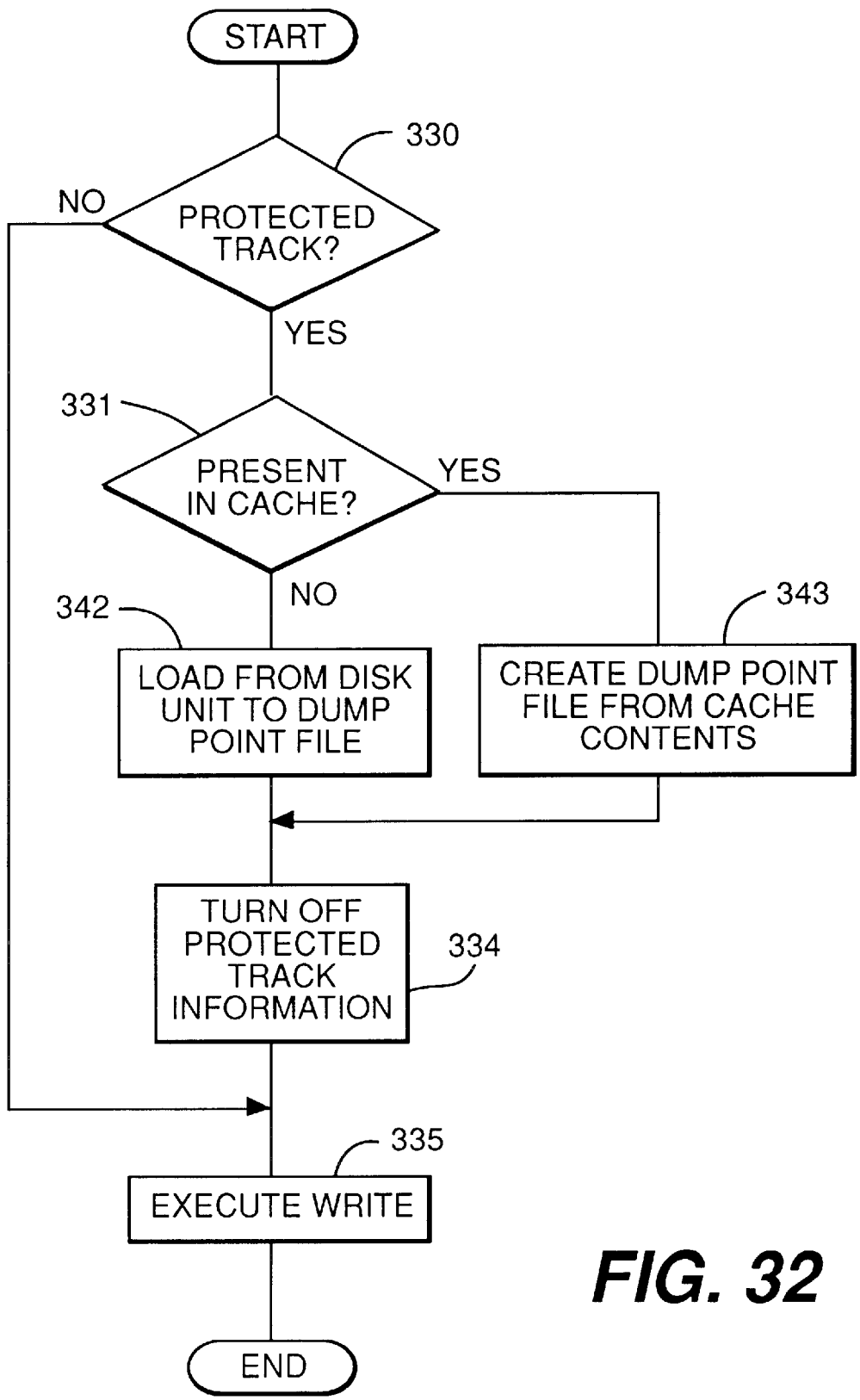
FIG. 32 is a flowchart showing the alternative write processing in the information processing system of FIG. 26.

It is apparent that the write processing 92' of FIG. 32 may be executed for the write processing 92 of FIG. 30. In the write processing 92 shown in FIG. 30, when the contents of a protected track are not stored in cache 25, the director 22c loads the contents of a protected track into the cache 25. Thereafter, the director 22c stores the contents of the protected track from cache 25 into dump point file 29. In this write processing 92', however, when the contents of the protected track are not stored in the cache 25, the contents are read from the disk unit 26 and stored in the dump point file 29 in step 342. On the other hand, the contents of the protected track are stored in t he dump point file 29, the contents stored in the cache 25 are stored in the dump point file 29 in step 335.

The above-mentioned write processing 92' is also applicable to the first through third embodiments, in addition to the fourth embodiment.

In the first through fourth embodiments, the dump point file is provided in a portion of the cache memory. It will be apparent that the file may be provided independently of the cache memory.

In the above-mentioned embodiments, each dump operation is recorded on the tape unit. It will be apparent that each dump operation may be recorded on an optical disc, a magnetic disk or other suitable recording apparatus.

Further more, in the first through fourth embodiments, the dumped contents are transferred to the tape controller via the CPU. It is readily apparent that the dumped contents may be transferred directly to the tape controller.

According to the present invention, the dump volume can be reduced and, at the same time, the contents of a track at the starting of a dumping operation can be completely dumped even if the contents are updated during the dumping operation.

We claim:

1. A storage controller that performs a plurality of dump processing requests, connected to a processor and a storage unit to control said storage unit, said controller comprising:

first storage means for storing write region information relating to a region in said storage unit in which a write operation is performed by a write instruction issued from said processor to said storage unit;

second storage means for storing protected region information relating to a region in said storage unit updated since a previous one of said dump processing requests that is included in a portion to be dumped specified by said processor and corresponding write region information stored in said first storage means, and for deleting said write region information corresponding to said region included in said portion to be dumped from said first storage means;

protecting means for saving contents into a dump point file of a region to be written that is designated by said processor with a write operation if said protected region information corresponding to the region to be written is stored in said second storage means, and for deleting said protected region information corresponding to the designated region from said second storage means;

dump read and transfer means for transferring contents of a region to be read for dumping in said dump processing requests specified by said processor with a dump read instruction if said protected region information corresponding to the region to be read for dumping is stored in said second storage means; and transfer means for transferring the contents of said dump point file to said processor upon receiving a dump point file read instruction issued from said processor.

2. A storage controller according to claim 1, further comprising a cache memory for storing a copy of contents of a region in said storage unit, wherein said dump read and transfer means has determination means for determining whether contents of said region to be read for dumping in said dump processing requests is stored in said cache memory, transfer means for transferring said contents of said region to be dumped from said cache memory if said contents of said region to be read for dumping is stored in said cache memory, and transfer means for transferring said contents of said region to be read for dumping from said storage unit if said contents of said region to be read for dumping is not stored in said cache memory.

3. A storage controller according to claim 1, further comprising a cache memory for storing a copy of contents of a region in said storage unit, wherein said protecting means has determination means for determining whether contents of the region to be written is stored in said cache memory, read means for reading said contents of the region to be written from said storage unit to said cache memory if said contents of the region to be written is not stored in said cache memory, and storage means for storing said contents of the region to be written from said cache memory to the dump point file.

4. An information processing system for performing a plurality of dump processing requests comprising:

a processor;

a first storage unit for storing data processed by said processor;

a second storage unit for storing dump data of said first storage unit;

a first information block for storing updated region information corresponding to a region which contents are updated by said processor in said first storage unit since processing of a previous one of said dump processing requests;

updated region setting means, operative in response to a write operation executed by said processor, for setting said updated region information corresponding to a region to be updated by said write operation into said first information block;

a second information block for storing protected region information corresponding to a region having data to be dumped into said second storage means;

protected region setting means, operative in response to a dump instruction issued by said processor for performing a plurality of dump processing requests, for setting said protected region information corresponding to a region included in a dump portion designated by said dump instruction and corresponding updated region information stored in said first information block, and for deleting said updated region information corresponding to said region included in said dump portion in said first information block;

protecting means, operative in response to said write operation, for saving contents of said region to be updated into a dump point file before updating data of said region to be updated if said protected region information corresponding to said region to be updated is stored in said second information block for deleting said protected region information corresponding to said region to be updated from said second information block; and transfer means for transferring contents of a region having said protected region information corresponding thereto and being stored in said second information block and for transferring contents of said dump point file to said processor to store dump data into said second storage unit.

5. An information processing system according to claim 4, further comprising a third information block for storing dump region information corresponding to a region having said protected region information corresponding thereto and being stored in said second information block at the beginning of the processing of the dump processing requests.

6. An information processing system according to claim 5, wherein said transfer means has:

determining means for determining whether dump region information corresponding to a region designated by said processor as a region to be read for dumping is stored in said third information block; and reporting means for reporting that the region designated as the region to be read for dumping is not required to be dumped if said protected information corresponding to the region designated as the region to be read for dumping is not stored in said second information block as a result of a determination by said determining means.

7. An information processing system according to claim 5, wherein said first information block includes a first updated region block and a second updated region block, and wherein said updated region setting means has first setting means for setting said updated region information corresponding to said region to be updated into said first updated region block when said dump region information corresponding to said region to be updated is stored in said third information block and second setting means for setting said updated region information into said second updated region block when said dump region information corresponding to said region to be updated is not stored in said third information block.

8. An information processing system according to claim 7, wherein said protected region setting means sets said protected region information on the basis of said updated region information stored in said first updated region block.

9. An information processing system according to claim 8, further comprising means for revising information stored in said first protected region block on the basis of information stored in said second protected region.

10. An information processing system according to claim 4, further comprising a cache memory for storing copies of data stored in said first storage unit, and wherein said dump point file is stored in said cache memory.

11. A storage controller according to claim 10, wherein said transfer means has:
   determination means for determining whether contents of a region to be transferred is stored in said cache memory;
   first transfer means for transferring said contents of said region to be transferred from said cache memory if said contents of said region to be transferred is stored in said cache memory; and
   second transfer means for transferring said contents of said region to be transferred from said first storage unit if said contents of said region to be transferred is not stored in said cache memory.

12. A storage controller according to claim 10, wherein said protecting means has:
   determination means for determining whether contents of the region to be updated is stored in said cache memory;
   read means for reading said contents of the region to be updated from said first storage unit to said cache memory if said contents of the region to be updated is not stored in said cache memory; and
   storing means for storing said contents of the region to be updated from said cache memory to the dump point file.

13. A dump method that performs a plurality of dump processing requests in an information processing system including a processor, a first storage unit having a plurality of tracks as units of data to transfer on dumping, a controller connected between said processor and said first storage unit and for controlling data transfer therebetween, and a second storage unit connected to said processor and for storing dump data, said dump method comprising the steps of:
   (a) designating, from said processor to said controller, respective portions of said first storage unit to be dumped for each of said dump processing requests;
   (b) registering only tracks having data updated since processing of a previous dump request by said processor and included in said respective portions to be dumped in a protected track information area as protected tracks to be dumped in said dump processing requests by said controller;
   (c) in response to a write request to write data to a one of said plurality of tracks that is registered as one of said protected tracks to be dumped in said dump processing requests, (c1) storing contents of said one protected track into a dump point file, (c2) deleting registration of said one protected track from the protected track information area, and (c3) writing the data to said one protected track;
   (d) transferring contents of said protected tracks and of said dump point file to said second storage unit;
   (e) deleting the registering of ones of said protected tracks, having contents that have been transferred to said second storage unit, from said protected track information area; and (f) in response to completion of said transferring, deleting said dump point file.

14. A dump method according to claim 13, further comprising the steps of:
   (g) in response to a write request to write data to a second one of said plurality of tracks other than said protected tracks to be dumped in said dump processing requests, writing the data to said second track; and
   (h) registering said second track in an updated track information area of memory as an updated track.

15. A dump method according to claim 14, wherein said step (c) further includes a step of (c4) registering said first track in said updated track information area.

16. A dump method according to claim 15, wherein said updated track information area includes first updated track information and second updated track information areas of memory, and wherein in said step (h) and in said step (c4), registration of said first and second tracks is made for both of said first and said second updated track information.

17. A dump method according to claim 16, wherein said step (b) includes the steps of:
   (b1) registering ones of said tracks included in said portion to be dumped in a dump portion information area of memory; and
   (b2) registering ones of said tracks that are registered in both of said first updated track information and said dump portion information areas into said protected track information area.

18. A dump method according to claim 17, wherein said step (b) further includes a step of (b3) clearing said second updated track information.

19. A dump method according to claim 18, wherein said step (f) includes the step of (f1) replacing information of said first updated track information area with information of said second updated track information area.

20. A dump method according to claim 17, wherein said step (b) further includes a step of (b3) replacing information of said dump portion information with information of said protected track information.

21. A dump method according to claim 20, wherein said step (d) includes the steps of:
   (d1) designating one of said tracks to be dumped from said processor to said controller;
   (d2) determining, with said processor, whether or not the designated track is registered in said dump portion information; and
   (d3) reporting from said controller to said processor that said designated track has not been updated if said designated track is not registered in said dump portion information.

22. A dump method according to claim 21, wherein said step (d) further includes the steps of:
   (d4) determining, in said controller, whether or not said designated track is registered in said protected track information area; and (d5) transferring contents of said dump point file corresponding to said designated track to said second storage unit if said designated track is not registered in said protected track information area and if registration of said designated track in said protected track information area was deleted as a result of performing said step c2.

23. A dump method according to claim 15, wherein said step (a) includes the steps of:

(a1) sending, from said controller to said processor, information related to tracks registered in said updated track information area; and (a2) deciding, with said processor, which of said tracks should be dumped and designating the tracks that should be dumped to said controller for each of said dump processing requests.

24. A dump method according to claim 23, wherein said step (b) includes the step of:

(b1) registering tracks designated by said step (a2) into said protected track information area.

25. A dump method according to claim 16 wherein said step (a) includes the steps of:

(a1) sending, from said controller to said processor, information related to said tracks registered in said first updated track information area; and (a2) deciding, with said processor, which tracks should be dumped and designating the tracks that should be dumped to said controller for each of said dump processing requests.

26. A dump method according to claim 25, wherein said step (b) includes step of:

(b1) registering said tracks designated by said step (a2) into said protected track information area.

27. A dump method according to claim 26, wherein said step (b) further includes the step of (b2) clearing said second updated track information.

28. A dump method according to claim 27, wherein said step (f) includes the step of (f1) replacing information of said first updated track information with information of said second updated track information.

29. A dump method according to claim 28, wherein said step (d) includes the steps of:

(d1) designating one of said tracks to be dumped from said processor to said controller; (d2) determining, with said controller, whether or not said designated track is registered in said protected track information area; and (d3) transferring contents of said dump point file corresponding to said designated track to said second storage unit if said designated track is not registered in said protected track information area.

30. A dump method according to claim 13, further comprising the steps of:

(g) in response to a write request that designates a track to be written, determining whether or not said track to be written is included in said dump portion;

(h) registering said track to be written into a first updated track information area of memory if said track to be written is not included in said dump portion; and (i) registering said track to be written into a second updated track information area of memory if said track to be written is included in said dump portion.

31. A dump method according to claim 30, wherein said step (i) includes the steps of:

(i1) determining whether or not said track to be written is registered in said protected track information area; (i2) executing said step (c) if said track to be written is registered in said protected track information area.

32. A dump method according to claim 31, wherein said step (a) includes the steps of:

(a1) sending, from said controller to said processor, information related to tracks registered in said first updated track information area; and (a2) deciding, in said processor, which tracks should be dumped and designating the tracks that should be dumped to said controller for each of said dump processing requests.

33. A dump method according to claim 32, wherein said step (b) includes the step of:

(b1) registering tracks designated by said step (a2) into said protected track information area.

34. A dump method according to claim 33, wherein said step (b) further comprises the steps of:

(b2) clearing said second updated track information; and (b3) deleting registration of tracks designated in said step (a2) from said first updated track information.

35. A dump method according to claim 34, wherein said step (f) includes the step of:

(f1) revising said first updated track information with said second updated track information.

* * * * *